US012746925B2

(12) United States Patent
Filipenko et al.

(10) Patent No.: US 12,746,925 B2
(45) Date of Patent: Sep. 29, 2026

(54) OVERTAKING ORCHESTRATION SYSTEM FOR AUTONOMOUS RACING

(71) Applicants: Constructor Technology AG, Schaffhausen (CH); Constructor Education and Research Genossenschaft, Schaffhausen (CH)

(72) Inventors: Maksim Filipenko, Batumi (GE); Ilya Shimchik, Zurich (CH); Stanislav Protasov, Singapore (SG); Nikolay Dobrovolskiy, Istambul (TR); Serg Bell, Costa del Sol (SG)

(73) Assignees: Constructor Technology AG, Schaffhausen (CH); Constructor Education and Research Genossenschaft, Schaffhausen (CH)

( * ) Notice: Subject to any disclaimer, the term of this patent is extended or adjusted under 35 U.S.C. 154(b) by 151 days.

(21) Appl. No.: 18/412,871

(22) Filed: Jan. 15, 2024

(65) Prior Publication Data

US 2025/0229782 A1 Jul. 17, 2025

(51) Int. Cl.
*B60W 30/18* (2012.01)
*B60W 60/00* (2020.01)

(52) U.S. Cl.
CPC .. *B60W 30/18163* (2013.01); *B60W 60/0015* (2020.02); *B60W 2300/28* (2013.01); *B60W 2552/30* (2020.02); *B60W 2554/4041* (2020.02); *B60W 2554/802* (2020.02); *B60W 2554/804* (2020.02); *B60W 2556/45* (2020.02)

(58) Field of Classification Search
CPC ..... B60W 30/18163; B60W 2420/403; B60W 2554/4041; B60W 2554/802; B60W 2554/4042; B60W 2554/804; B60W 60/00276; B60W 60/001; B60W 40/04; B60W 2554/4049
USPC .......................................................... 701/24
See application file for complete search history.

(56) References Cited

U.S. PATENT DOCUMENTS 12,005,925 B1 * 6/2024 Gogna ............... B60W 60/0011
2021/0026359 A1 1/2021 MacGregor et al.
2021/0316760 A1 * 10/2021 Okoshi ............ G08G 1/096811
2022/0316896 A1 * 10/2022 Umeda ................. B60W 40/06
2023/0219599 A1 7/2023 Filipenko et al.

FOREIGN PATENT DOCUMENTS

CN 112918477 A 6/2021
KR 20170053880 A * 5/2017 ............ B60W 50/14

* cited by examiner

*Primary Examiner* — Hossam M Abd El Latif
(74) *Attorney, Agent, or Firm* — ESPE Legal Consultancy FZ-LLC

(57) ABSTRACT

An orchestration platform manages overtaking by autonomous vehicles by way of dividing a course into decision zones and execution zones. Autonomous vehicles proposed overtaking trajectories in the decision zones, which are evaluated and accepted or rejected by the orchestration platform. The orchestration platform is implemented as a master path coordinator that communicates wireless with the autonomous vehicles or at the vehicle level by acting as an on-board mediator of proposed trajectories. Autonomous vehicles are permitted to execute overtaking trajectories that meet certain predetermined safety requirements.

20 Claims, 18 Drawing Sheets

OVERTAKING ORCHESTRATION SYSTEM FOR AUTONOMOUS RACING

TECHNICAL FIELD

The present disclosure generally relates to autonomous racing vehicles and related systems.

BACKGROUND

Autonomous racing is an aspect of self-driving car technology. In racing environments, autonomous cars typically maneuver at relatively high speeds compared to autonomous passenger cars used on public roads. Further, the overtaking of one vehicle by another presents inherent risks. Racing with human drivers employs safety rules for overtaking, such as the "one move" rule in Formula One, which limits the number of defensive maneuvers a leading car can take to block an overtaking car. Even with such rules, experienced human drivers still make unsafe maneuvers during overtaking resulting in collisions or assessment of penalties. The problems of safe overtaking are also present for autonomous vehicles. In high-speed environments with autonomous vehicles, current artificial intelligence (AI) hardware and software struggle to comply in a timely manner with imposed constraints, such as safety margin, non-collision, speed, stability, and controllability. Improved ways to manage overtaking safely are needed.

SUMMARY

Safety and performance is enhanced by an orchestration platform that controls overtaking by autonomous vehicles under conditions where optimal speed is important, such as racing conditions, qualifications, or performance testing.

The orchestration platform can be implemented as a system for managing overtaking by autonomous vehicles that includes a control unit comprising a computing device with a processor and a wireless transmitter and receiver for communication with autonomous vehicles. A course is identified for the autonomous vehicles with predetermined zones along its path. The zones include an execution zone and a decision-making zone, typically designed before a change in course geometry, such as a curve or turn. In another embodiment, a change in course geometry reflecting a decision-making zone can be a curve such as a steady turn followed by a straight section. In still other embodiments, an execution zone and a decision-making zone can be implemented in the same or similar course geometry (e.g. a long straightaway). The decision-making zone precedes the execution zone on the course. The control unit's computing device receives and analyzes proposed overtaking trajectories and counter-trajectories from the autonomous vehicles while they are in the decision-making zone. When the control unit receives a proposed overtaking trajectory from a trailing autonomous vehicle, the control unit requests a proposed defensive counter-trajectory from the first autonomous vehicle.

In some embodiments, the proposed defensive counter-trajectory includes a path through the execution zone and a curve or turn that accounts for the proposed overtaking trajectory by the attacking autonomous vehicle. In alternative embodiments, the defensive counter trajectory is proposed as a normal, optimal line without knowing the proposed overtaking trajectory.

The control-unit computing device compares a proposed overtaking trajectory with a proposed defensive counter-trajectory. A proposed overtaking trajectory is rejected if the proposed counter-trajectory allows the leading autonomous vehicle to remain ahead of the trailing autonomous vehicle throughout the execution zone. An overtaking trajectory is approved if the proposed overtaking trajectory allows the trailing autonomous vehicle to pass safely in the execution zone.

In some embodiments, the control unit is located on or near the course and separate from the first and second autonomous vehicles. The control unit may also be distributed between the first and second autonomous vehicles and the course.

In some embodiments, the number of n autonomous vehicles is 3 or more.

In some embodiments, a decision zone is identified for the n autonomous vehicles dynamically after they enter the decision zone. In some embodiments, a decision zone is predefined, static, and shared with n autonomous vehicles before they enter the decision zone, or before a race begins. A combination of dynamic and static decision zones are used in some embodiments.

The orchestration platform can also be implemented as a method for controlling overtaking by a leading first autonomous vehicle and trailing second autonomous vehicles on a course comprising a curve using a control unit including a processor, a nonvolatile storage medium, and a wireless transmitter and receiver for communication with the first and second autonomous vehicles.

A predetermined execution zone and a predetermined decision zone on the course located before the curve are identified for the autonomous vehicles. The decision-making zone is proximate and before the execution zone. The curve is proximate and after the execution zone. A first sensor detects entry of the autonomous vehicles into a decision zone. The control unit sends a wireless request for a proposed overtaking trajectory to the trailing second autonomous vehicle. The control unit also sends a wireless request for a proposed defensive trajectory to the leading first autonomous vehicle.

If the second autonomous vehicle intends to overtake the first autonomous vehicle, the control unit will receive a proposed overtaking trajectory from the second autonomous vehicle. In an embodiment, the control unit also receives a proposed defensive trajectory from the first autonomous vehicle. The control unit compares the proposed overtaking trajectory with predetermined minimum requirements for the autonomous vehicles during an overtaking and wirelessly sends an approval of the proposed overtaking trajectory to the second autonomous vehicle if the predetermined minimum requirements are satisfied.

The control unit also compares the proposed defensive trajectory with predetermined minimum requirements and wirelessly sends an approval of the proposed defensive trajectory to the first autonomous vehicle if the predetermined minimum requirements are satisfied. A rejection of the proposed defensive trajectory will be sent if the proposed defensive trajectory does not meet predetermined minimum requirements. In cases where both proposed trajectories are approved, the control unit confirms trajectories for the first and second autonomous vehicles.

In an embodiment, the predetermined requirements for overtaking include a minimum velocity advantage for the second autonomous vehicle with respect to the first autonomous vehicle. The predetermined requirements for overtaking can include a minimum safe distance between the first and second autonomous vehicles.

In an embodiment, a second request for a proposed defensive trajectory is sent to the first autonomous vehicle while the first autonomous vehicle remains in the decision zone if a proposed defensive trajectory is not received at the control unit from the first autonomous vehicle.

In an embodiment, the control unit requests and receives an alternative safety trajectory from the first autonomous vehicle after the first autonomous vehicle enters the decision zone. The control unit can approve the alternative safety trajectory by sending confirmation to the first autonomous vehicle.

In an embodiment, a second sensor is used to detect the actual path of the first autonomous vehicle and compare the actual path with the proposed defensive trajectory. The control unit can also record the variance between the proposed defensive trajectory and the actual path of the first autonomous vehicle.

The orchestration platform can also be implemented by a method for controlling overtaking by first and second autonomous vehicles on a course, where the first and second autonomous vehicles have a control unit including a processor, a nonvolatile storage medium, and a wireless transmitter and receiver for communications between the control units of the first and second autonomous vehicles.

The second autonomous vehicle detects its own entry into the predetermined decision zone and determines that it is trailing the first autonomous vehicle. The second autonomous vehicle calculates an overtaking trajectory with respect to the first autonomous vehicle and sends, by the second autonomous vehicle's wireless transmitter, a proposed overtaking trajectory to the first autonomous vehicle. The second autonomous receives a proposed defensive trajectory from the first autonomous vehicle in response to the proposed overtaking trajectory and compares, using its control unit, the proposed overtaking trajectory with the proposed defensive trajectory. The second autonomous vehicle's control unit decides whether the overtaking is permitted in accordance with predetermined requirements and sends its control unit's decision that the overtaking trajectory is permitted to the first autonomous vehicle with a request for confirmation of this decision by the first autonomous vehicle. The second autonomous vehicle receives a confirmation from the first autonomous vehicle that the proposed overtaking trajectory is permitted and executes the proposed overtaking trajectory.

In an embodiment, a control unit is installed onboard each of the first and second autonomous vehicles. In an alternative embodiment, the onboard control unit hardware is virtualized.

In an embodiment, the predetermined requirements for overtaking include a minimum velocity advantage for the second autonomous vehicle with respect to the first autonomous vehicle. In an embodiment, the predetermined requirements for overtaking include a minimum safe distance between the first and second autonomous vehicles.

In an embodiment, a second request for a proposed defensive trajectory is sent to the first autonomous vehicle while the first autonomous vehicle remains in the decision zone if a proposed defensive trajectory is not received at the second autonomous vehicle from the first autonomous vehicle. In some embodiments, an alternative safety trajectory is received from the first autonomous vehicle while the first autonomous is still in the decision zone.

BRIEF DESCRIPTION OF THE DRAWINGS

FIG. 2-1 is a diagram of an alternative overtaking scenario without orchestration platform control, according to an embodiment.

FIG. 4-1 is a diagram of an alternative overtaking scenario under orchestration platform control, according to an embodiment.

FIG. 6-1 is a diagram of a variation of the overtaking scenario under orchestration platform control of FIG. 6, according to an embodiment.

FIG. 7-1 is a diagram of a variation of the alternative overtaking scenario under orchestration platform control of FIG. 7, according to an embodiment.

DETAILED DESCRIPTION

Figure 1:
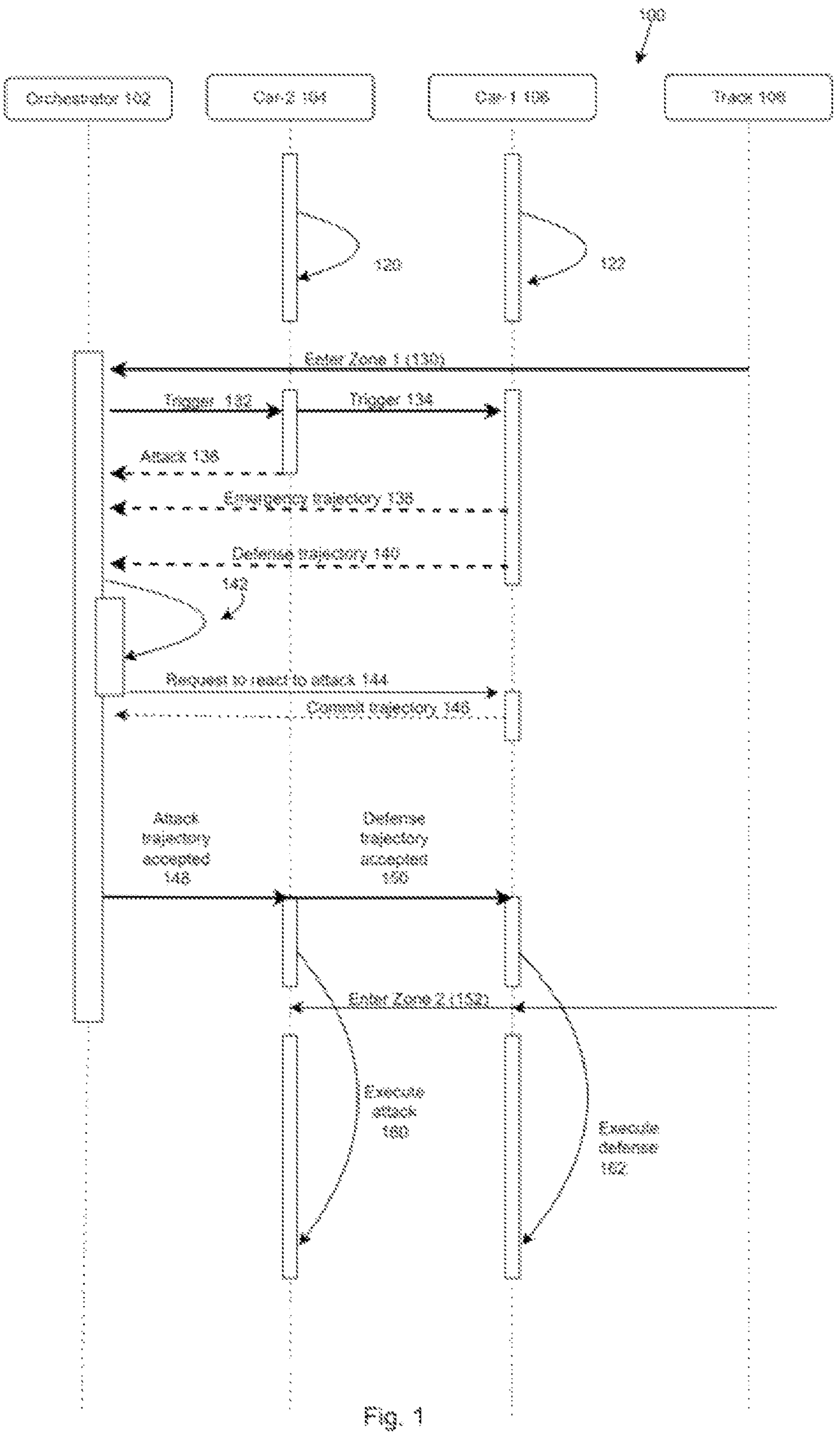
FIG. 1 is a timing diagram of an overtaking scenario under orchestration platform control, according to an embodiment.

An overtaking orchestration protocol reduces the uncertainty of autonomous racing agents' behavior. The orchestration systems and its methods for use reduce the probability of collisions, create natural-looking and entertaining overtakes. The system and method also determine responsibility in case of incidents related to overtaking.

Autonomous racing cars employ high-speed and low-latency vehicle-to-vehicle communication systems. Embodiments resolve ambiguity in car positions by negotiating future trajectories using a race-orchestration protocol. Further, embodiments help prevent collisions between autonomous cars during overtaking maneuvers. When implemented in an autonomous racing environment, the disclosed systems and methods create conditions for natural-looking, spectacular overtakes.

In an embodiment, a system assigns blame for incidents during overtaking maneuvers.

Key technical aspects of the systems and methods are implemented primarily at the level of the autonomous racing car or the level of track infrastructure or by a combination of the two. In embodiments, though certain infrastructures are provided by way of example herein, components can be distributed or cloud-based.

A racing course generally comprises a continuous, predetermined track. A decision-making zone operates as a continuous zone of the track, predetermined before a race begins. An execution zone comprises another predetermined continuous sub-zone on the track. Execution zones are defined in relation to decision-making zones. Each decision-making zone is followed by an execution zone.

In some embodiments, further zones are predetermined before a race. For example, a safety emergency zone can be designated. Another example is a predetermined run-off zone.

The use of predetermined zones allows for racing trajectories or approximations of racing trajectories to be computed offline, before the race to satisfy zone constraints and reduce computation time during a race. For example, for a given vehicle, one or more trajectories are calculated for the given track.

Autonomous racing cars and the teams controlling them can be viewed as agents in relation to the orchestration platform. Future trajectories committed by agents are evaluated by the platform computing metrics, such as distance or position. For example, an overtaking maneuver can be assessed as a reduction of distance below a margin or a change in position. The outcome of an attempted overtaking is processed by the platform as successful or not in view of the competing trajectories proposed by agents for their autonomous cars.

In embodiments of the orchestration platform, a set of commands are issued to racing agents. For example, a command is sent with a safety margin that should not be crossed, or a zone in which it is prohibited to enter. In an embodiment, the platform includes an enforcement mechanism system to enforce rules established for the racing agents. For example, in alternative embodiments, a time penalty is assessed, or a speed limit imposed, or a power reduction implemented.

Rule sets defined by the platform give agents advance notice of racing parameters. Examples of such rule sets include allowed racing parameters such as safety margins, allowed speeds and agent positioning relative to each other and the course geometry. Platform rules and prescriptions for agents are implemented by the system to ensure safe overtaking. For example, trajectories are committed and accepted only when an autonomous car is in a decision-making zone. Thus, the platform will not receive or approve changes to a committed trajectory in an execution zone. In this context, trajectory refers generally to data that identify possible future car positions on the track.

In operation, the orchestration platform manages a set of N agents operating on the track at the same time. In this context, agents generally comprise autonomous cars and the teams that manage the autonomous cars before and during a race. While racing, the N agents interact with each other and the orchestration platform. In an embodiment, any two agents can trigger the orchestration platform when certain conditions occur. Some of these conditions are predefined by the platform. Examples include proximity, low time to collision, and similar safety metrics.

When the orchestration platform is triggered by a zone-related event during a race, the agents are able to engage in certain interactions with the platform. In an embodiment, the orchestration platform designates predetermined zones on the track and queries the agents when an autonomous car enters one of these zones. The agents engage with the platform to safely navigate through a given zone. For example, the platform accepts requests from the agents to change their relative positions by performing overtaking in a predetermined execution zone. The platform generates and communicates rules and prescriptions to the agents. The agents receive platform feedback and communicate with the platform by committing proposed trajectories. This communication with the platform involving committed trajectories takes place while the agents are in a decision-making zone. Committed trajectories must meet predefined requirements established by the platform. For example, a proposed trajectory must keep an autonomous car inside the track boundaries, avoid prohibited zones, and maintain safe distances from other cars or track objects. The platform allows agents to execute maneuvers in an execution zone if those maneuvers meet specific conditions established by the platform in view of track geometry, safety requirements, and counter-maneuvers or trajectories proposed by other agents. In an embodiment, the platform enforces its rules and prescriptions by assessing penalties against the agents for noncompliance.

FIG. 1 shows an exemplary sequence of events in system 100 comprising orchestrator 102, trailing car-2 104, leading car-1 106, and track 108. In this example, the orchestration platform controls a two-car overtaking scenario, such as involving a fight for position on a corner.

At the outset of this example, Car-2 104 executes racing line 120 while car-1 106 executes racing line 122. Both cars then enter Zone 1 130, which is a decision-making zone. Orchestrator 102 then sends a trigger 132 to car-2 104 and trigger 134 to car-1 106. Triggers 132 and 134 are linked to entry into a decision-making zone (e.g. Zone 1 130) and give the racing agents an opportunity to propose overtaking trajectories. In an embodiment, trailing car-2 104 perceives an opportunity for overtaking car-1 106 and sends attack proposal 136 for overtaking car-1 106 to orchestrator 102. Leading car-1 106 sends a defensive trajectory 140 to orchestrator 102. In an alternative embodiment, leading car-1 106 also sends emergency trajectory 138. Orchestrator 102 analyzes the proposed attack and defense trajectories. If the proposed attack trajectory meets predetermined parameters, orchestrator 102 accepts the attack trajectory with decision acceptance 142. Orchestrator 102 then sends a request 144 to car-1 106 to commit to a safe response to the attack. In response, car-1 106 sends a commit trajectory 146.

In this example, orchestrator 102 sends an attack trajectory acceptance 148 to car-2 104 and defense trajectory acceptance 150 to car-1 106. Car-2 104 and car-1 106 then enter zone 2 152, which is an execution zone. When the autonomous vehicles enter zone 2 152, no further trajectory changes are permitted. Once in the execution zone, the autonomous vehicles execute the trajectories approved by orchestrator 102. The attack trajectory 160 is executed by car-2 104 and defense trajectory 104 is executed by car-1 106. If the autonomous vehicles execute attack and defense trajectories in accordance with orchestrator 102 instructions, trailing car-2 104 will be able to safely overtake leading car-1 106.

In the scenario of FIG. 1, the leading car defends by proposing a normal racing line. A normal racing line is an optimal path around a track. This optimal path allows an autonomous vehicle to traverse a portion of track, such as a curve or corner, at the highest possible safe speed. An ideal racing line uses the entire width of the track to lengthen the radius of a turn. This is done by entering at the outside edge, touching the "apex" (a point on the inside edge) and then leaving the turn by returning outside.

Other overtaking scenarios may be managed by the orchestration platform, such as when the leading car does not propose a normal line or when the leading car does not propose any defensive trajectory while in the decision-making zone. These alternative overtaking scenarios are addressed below in connection with FIG. 4 and FIG. 5.

Figure 2:
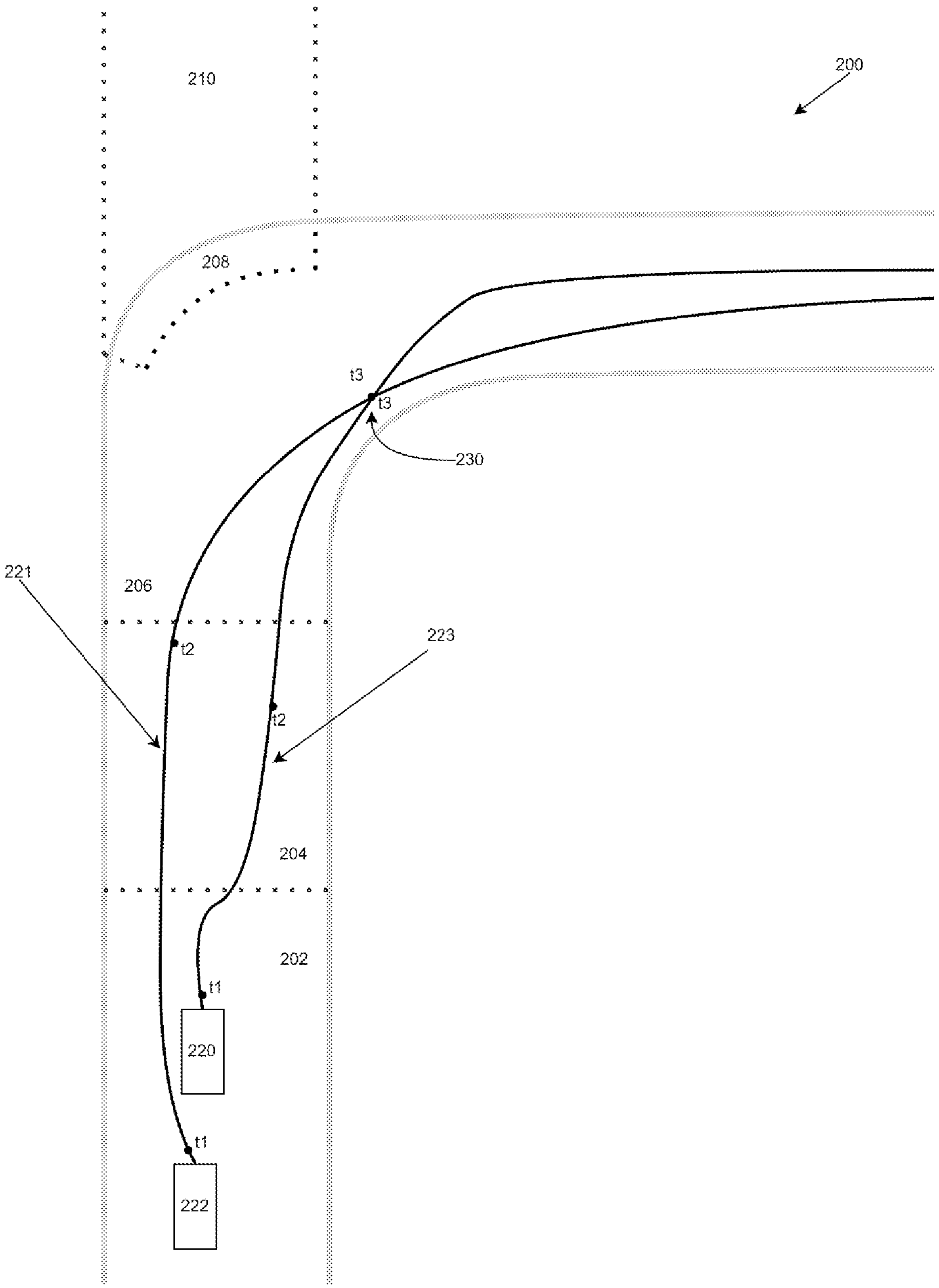
FIG. 2 is a diagram of an overtaking scenario without orchestration platform control, according to an embodiment.
Figures 1, 2:
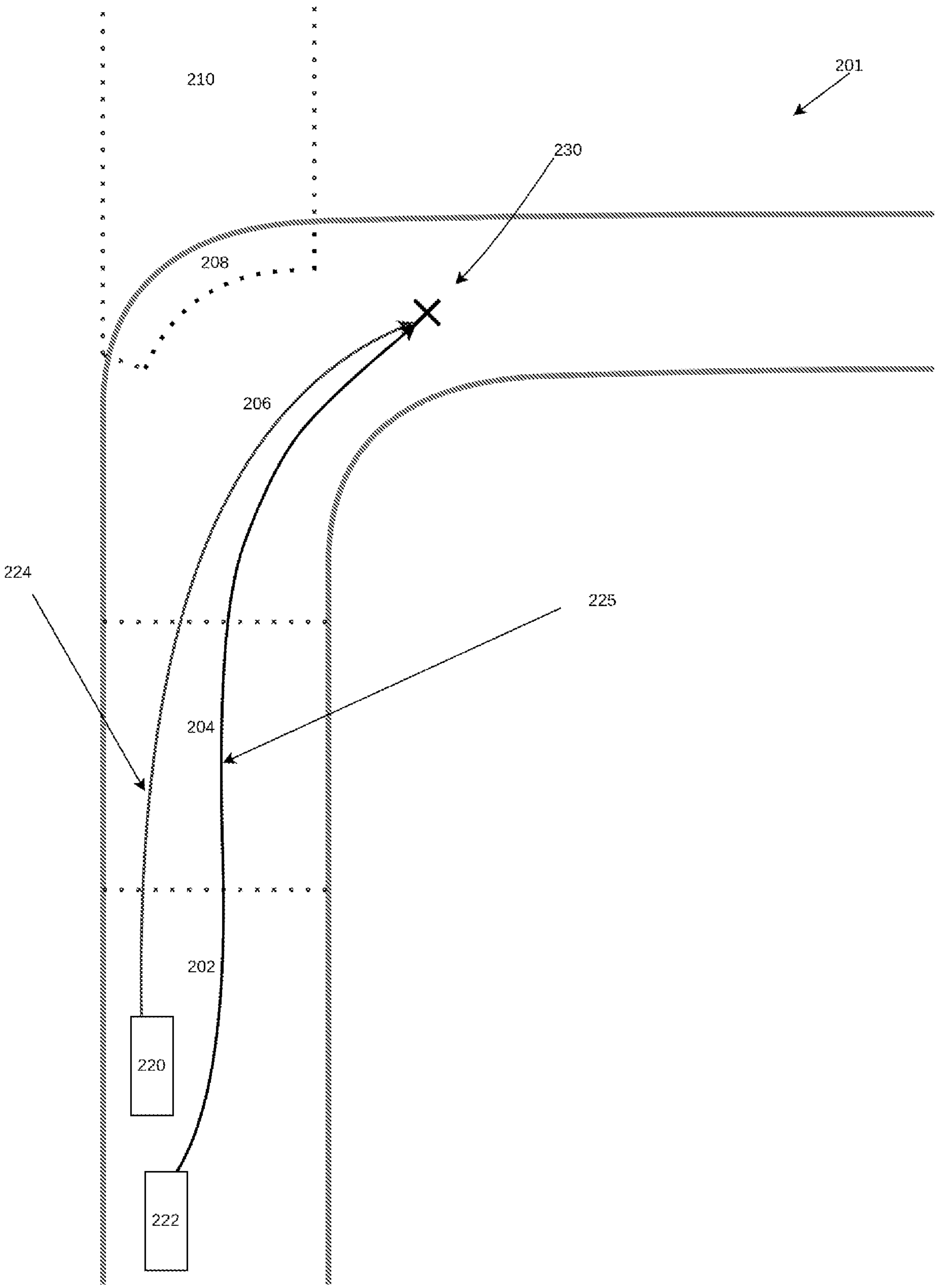

FIG. 2 shows an example 200 of autonomous-vehicle overtaking without any platform control. In this example, zone 202 serves as a decision zone for maneuvers in execution zone 204 before reaching corner 206. Cars 220 and 222 are driving the racing line, with car 220 leading car 222. Car 222 intends to execute attacking trajectory 221 to pass car 220 on the inside at corner 206. For purposes of illustration, car 222 is assumed to have a perceived advantage over car 220. Car 222 therefore plans and executes an overtaking trajectory 221 through execution zone 204 that car 222 expects will result in overtaking car 220 at corner 206. Car 220 calculates a trajectory 223 that does not leave enough space for car 222 and the two cars collide at point 230.

The chronology of the two trajectories 221, 223 is shown by the relative positions of cars 220, 222 at three different times: t1, t2, and t3. Both cars 220 and 222 are in decision-making zone 202 at time t1. At time t2, car 222 has taken an advantage over car 220 just before entering corner 206. Cars 220, 222 then collide at time t3.

FIG. 2-1 shows an alternative scenario 201 where car 220 takes outside trajectory 224 while car 222 takes inside trajectory 225. In this scenario, the primary responsibility for avoiding collision has shifted. The primary responsibility for generating a safe response trajectory depends on car position. In general, the vehicle with an outside trajectory with respect to a turn will be responsible for generating a noncollision response. The vehicle with the outside trajectory generally has the ability to avoid a collision by, for example, taking a wider outside trajectory.

Figure 3:
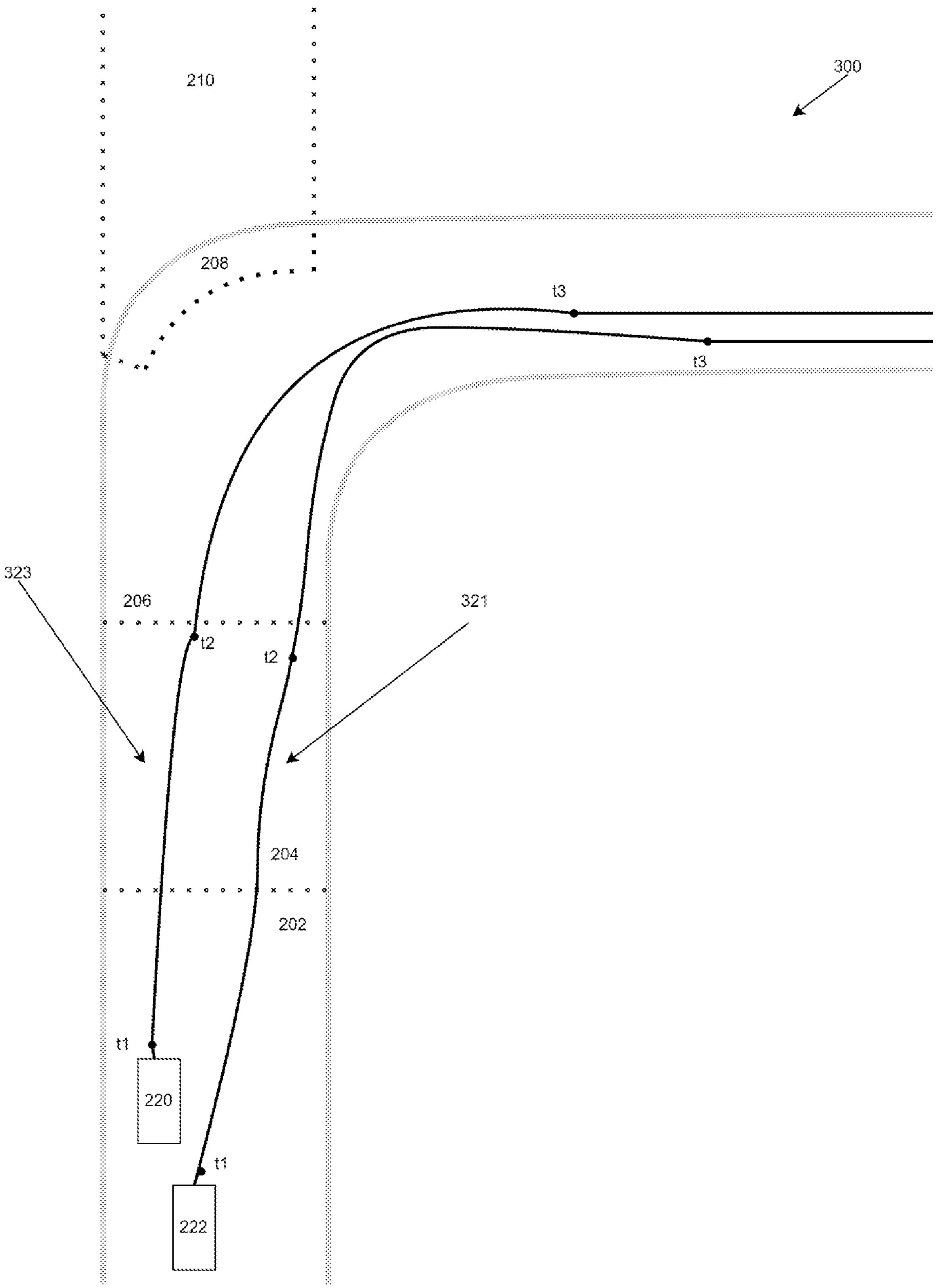
FIG. 3 is a diagram of an overtaking scenario under orchestration platform control, according to an embodiment.

FIG. 3 shows an application 300 of orchestration platform control to the racing scenario such as shown in FIG. 2. Cars 220 and 222 are driving the racing line. Car 222 has an advantage over car 220. In an embodiment, the orchestrator triggers the overtaking process by sending an overtaking flag to car 222 and validating correct initial conditions. Car 222 receives the overtaking flag and in response generates a message with a proposed trajectory 321 to overtake car 220. Car 220 also receives the overtaking flag. In response, car 222 generates a response message. In an embodiment, the message comprises a trajectory for defense 323. In alternative embodiments, the message comprises a trajectory through emergency zone 208 or a trajectory for run-off area 210. In an embodiment, either or both trajectory through emergency zone 208 and trajectory for run-off area 210 are included with the defense trajectory. In another embodiment, the message comprises one or both trajectory through emergency zone 208 or trajectory for run-off area 210 as alternatives to the defense trajectory.

Agent responses from car 220 and car 222 are received by the orchestration platform. In embodiment, these agent responses follow a chronological sequence linked to decision zone 202 and execution zone 204. For example, the platform communicates with car 220 in the decision zone and requests a proposed trajectory to meet the overtaking trajectory proposed by car 222. In an embodiment, if car 220 does not provide a defensive trajectory while in the decision-making zone, then car 220 will be penalized by the system.

The chronology of the two trajectories 321, 323 is shown by the relative positions of cars 220, 222 at three different times: t1, t2, and t3. Both cars 220 and 222 are in decision-making zone 202 at time t1. At time t2, car 222 has taken an advantage over car 220 just before entering corner 206. Car 222 has successfully overtaken car 220 at time t3.

Overtaking is permitted when proposed trajectories meet certain conditions. In many embodiments, these conditions include the relative velocity and relative position of car 220 and car 222. For example, the proposed trajectory of car 222 will satisfy conditions for overtaking when it includes a relative velocity margin between the two cars that is more than a predetermined threshold of x kilometers per hour (kmph). In an embodiment, the x kmph value is determined by the platform before the race. The x value may be established based on track geometry, racing conditions, historical results, or the technical specifications of the autonomous cars. A combination of factors may also be used to determine the kmph threshold. In an embodiment, the x kmph value is determined by the platform dynamically during the race.

Relative velocity may be a sufficient condition for overtaking, but it is not always necessary. Overtaking conditions can also be met even when the velocity margin between two cars is less than x kmph. For example, car 222 may propose a trajectory that does not meet the relative velocity threshold but the proposed trajectory positions cars relative to each other such that the racing line of car 220 is compromised and it cannot defend against overtaking by car 222.

The orchestration platform may also reject proposed trajectories based on relative position even though relative velocity thresholds are met. For example, a trajectory with sufficient velocity to overtake but does not preserve safety margins for distance between cars will be rejected. Alternatively, a proposed trajectory will be rejected if that trajectory does not place car 222 on the inside of curve 206 before car 220 reaches curve 206. An overtaking trajectory may also be rejected because it does not provide enough space for car 220 at the exit of the curve 206. In an embodiment, the platform accepts all proposed trajectories that meet the relative velocity threshold and comply with relative positional requirements and safety margins.

As shown in FIG. 3, the orchestration platform ensures that the possible collision trajectories of FIG. 2 are avoided. Overtaking car 222 takes an inside position with respect to leading car 220, which could result in a collision if car 220 maintains a trajectory that doesn't leave enough room for car 222. In orchestration system 300 shown in FIG. 3, car 222 has an advantage and proposes an attack trajectory. Car 220 generates a normal (valid) trajectory in response to the attack. The overtaking by car 222 occurs safely under platform control.

Figure 4:
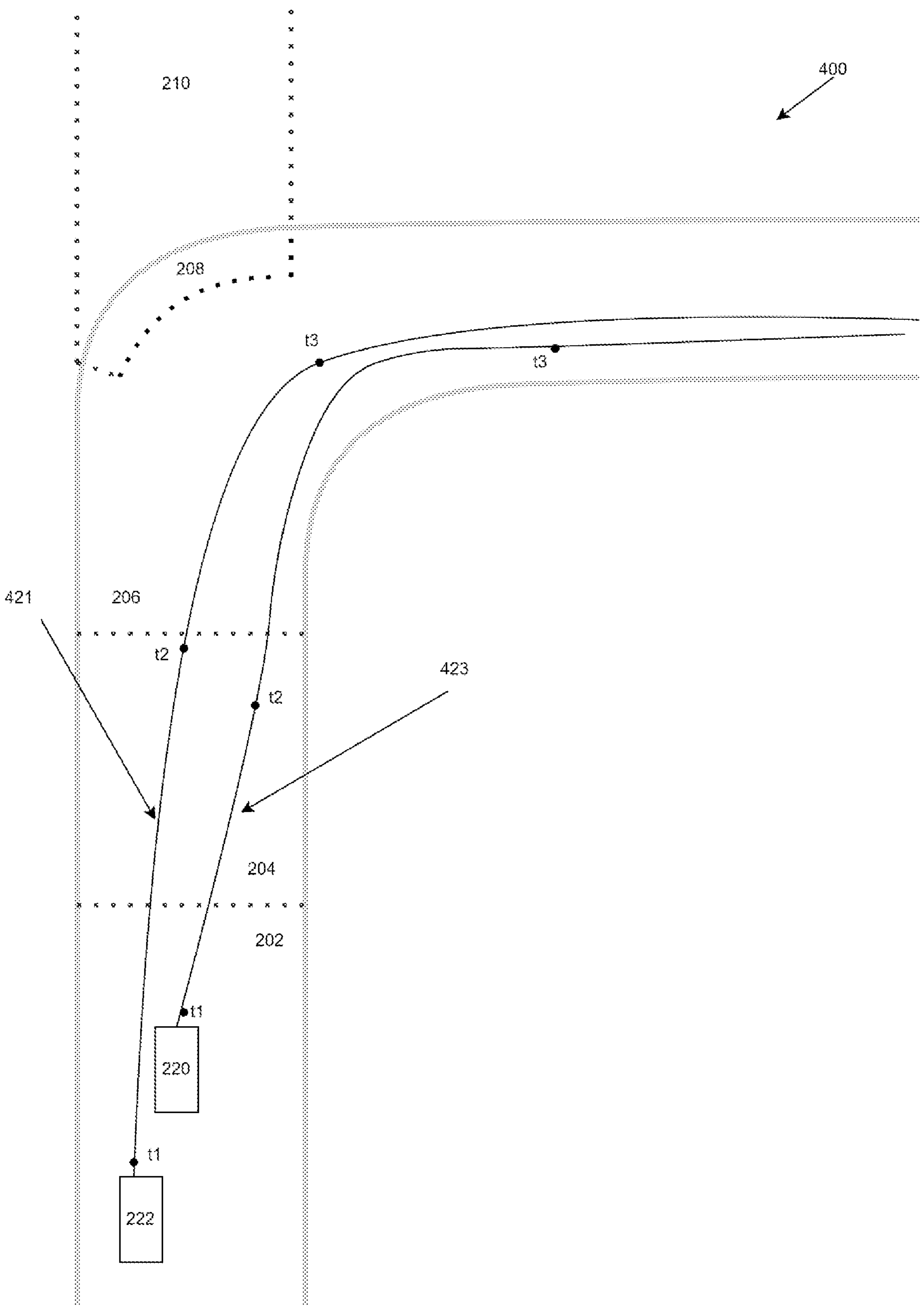
FIG. 4 is a diagram of an alternative overtaking scenario under orchestration platform control, according to an embodiment.
Figures 1, 4:
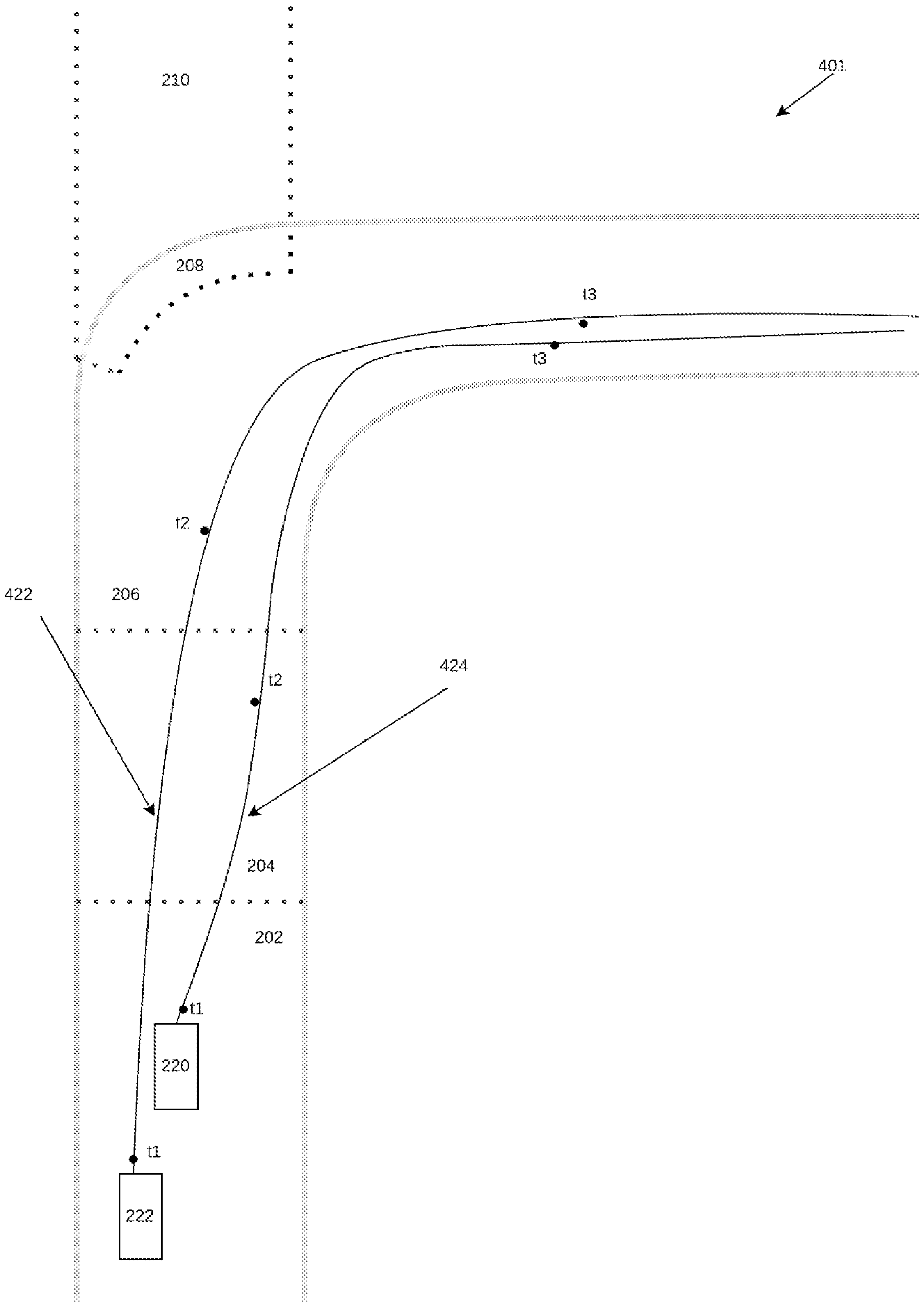
Figure 5:
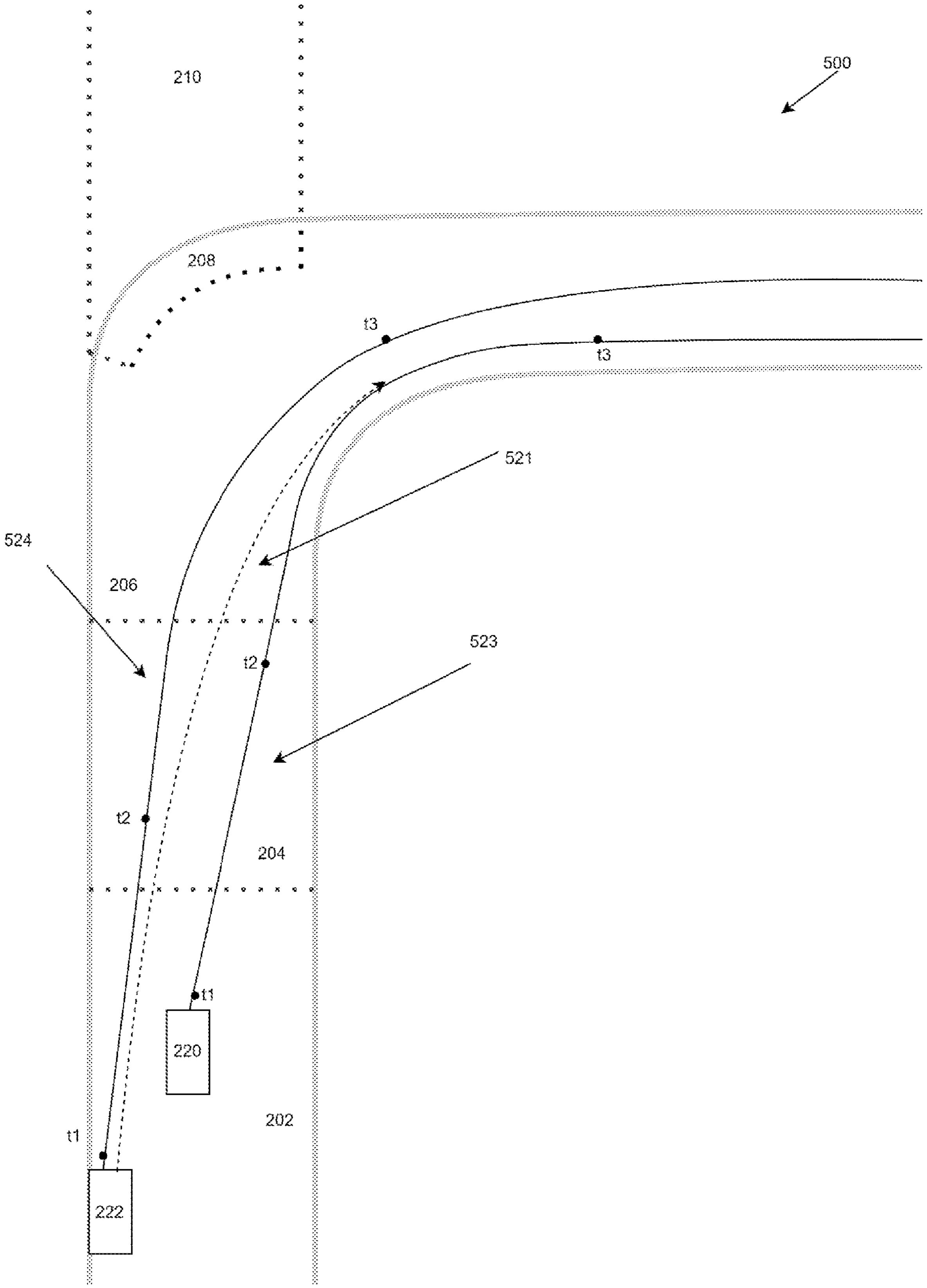
FIG. 5 is a diagram of an alternative overtaking scenario under orchestration platform control, according to an embodiment.

FIG. 4 and FIG. 5 show alternative scenarios where a proposed overtaking does not result in actual overtaking by the following autonomous vehicle. In FIG. 4, car 222 generated a normal line 421 in response to car 220's defensive trajectory 423 but does not overtake car 220. At time t2, car 222 was in position to overtake car 220 but did not execute trajectory 421 effectively enough to overtake car 220, which was still leading car 222 at time t3. Trajectory 421 was a valid trajectory for overtaking under orchestration platform control. Car 220's defensive trajectory 423 was also a valid trajectory for defense. In the embodiment shown in FIG. 4, collision was avoided because the trajectories 421 and 423 did not lead to collision and safety parameters were observed.

FIG. 5 shows an alternative scenario where car 222 proposed a valid overtaking trajectory 521 and car 220 proposed a valid defensive trajectory 523. Cars 220 and 222 are driving the racing line. Car 222 perceives an advantage, triggers the system, and generates a racing line 521 at time t1 as an attack trajectory. Car 220 generates an inside line defense trajectory 523 in response. Now cars 220 and 222 are on a potential collision course. The platform requests a valid trajectory response from car 222 to account for the defense trajectory of car 220. Car 222 generates a valid outside non-collision trajectory 524 that does not lead to overtaking. Car 220 maintains its lead through corner 206 and remains in the lead at time t3. Even though car 222's original attacking trajectory 521 would not have resulted in overtaking, the proposal was still a valid trajectory when it was proposed. Even if the original trajectory 521 would not likely have resulted in overtaking before knowing car 220's defense trajectory, the platform accepted trajectory 521. Such maneuvers could still be beneficial for car 222 even when overtaking does not take place. For example, car 222 could gain an advantage in the next curve by adjusting its position on the track relative to car 220. In this way, multiple attack trajectories and multiple defense trajectories can be considered by the platform. For example, a series of attack moves can be proposed by car 222, and a series of defensive moves can be proposed by car 220, in the case where car 222 intends to overtake car 220 not on the instant curve but rather, set itself up for overtaking on a subsequent second curve. In an embodiment, car 222 can therefore trigger the system multiple times with individual attack trajectories that are associated with each other. Similarly, car 220 can generate multiple defense trajectory communications, each as bounded by the respective decision-making zones of the respective course geometries.

Figure 6:
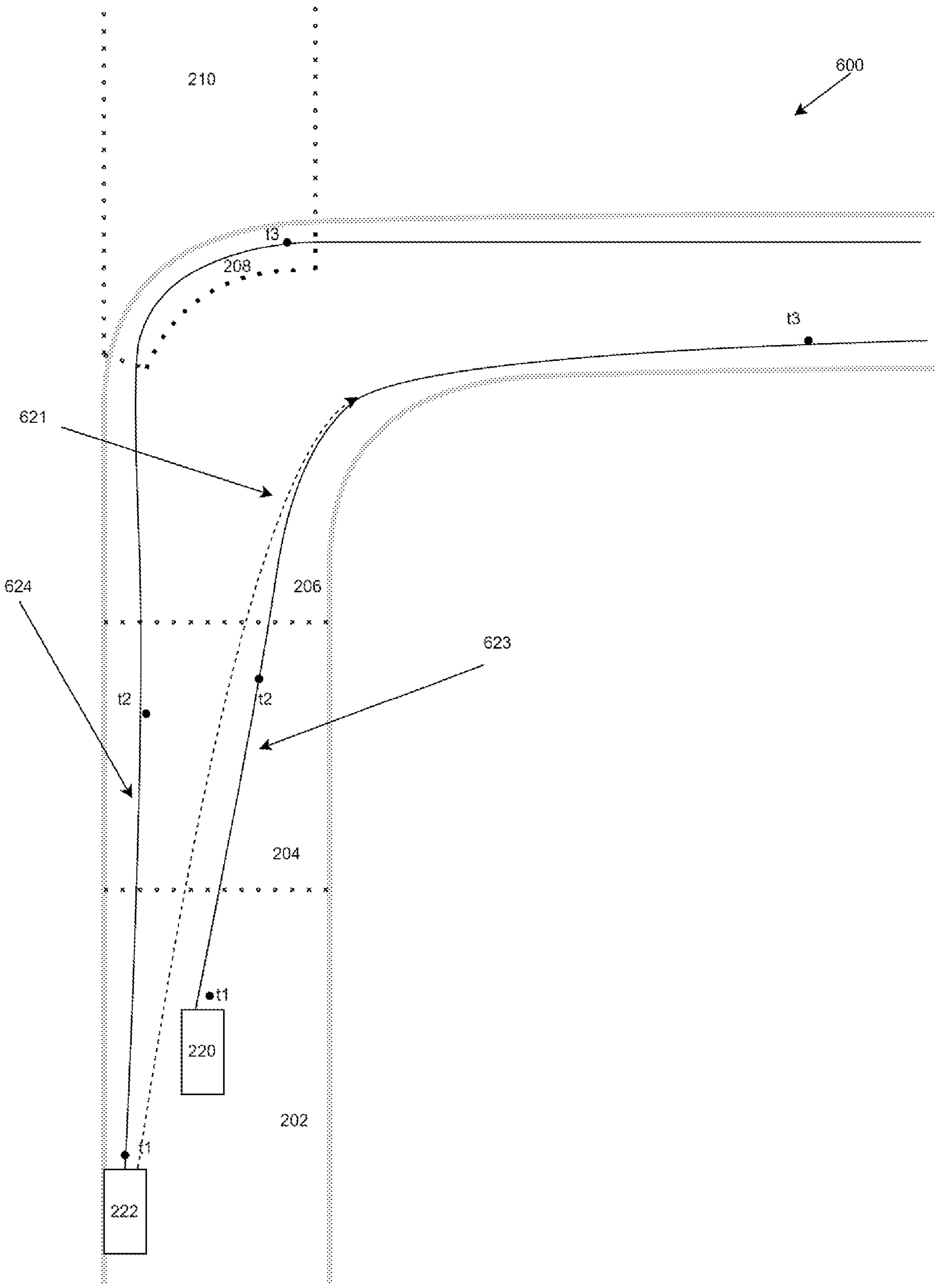
FIG. 6 is a diagram of an alternative overtaking scenario under orchestration platform control, according to an embodiment.
Figures 1, 6:
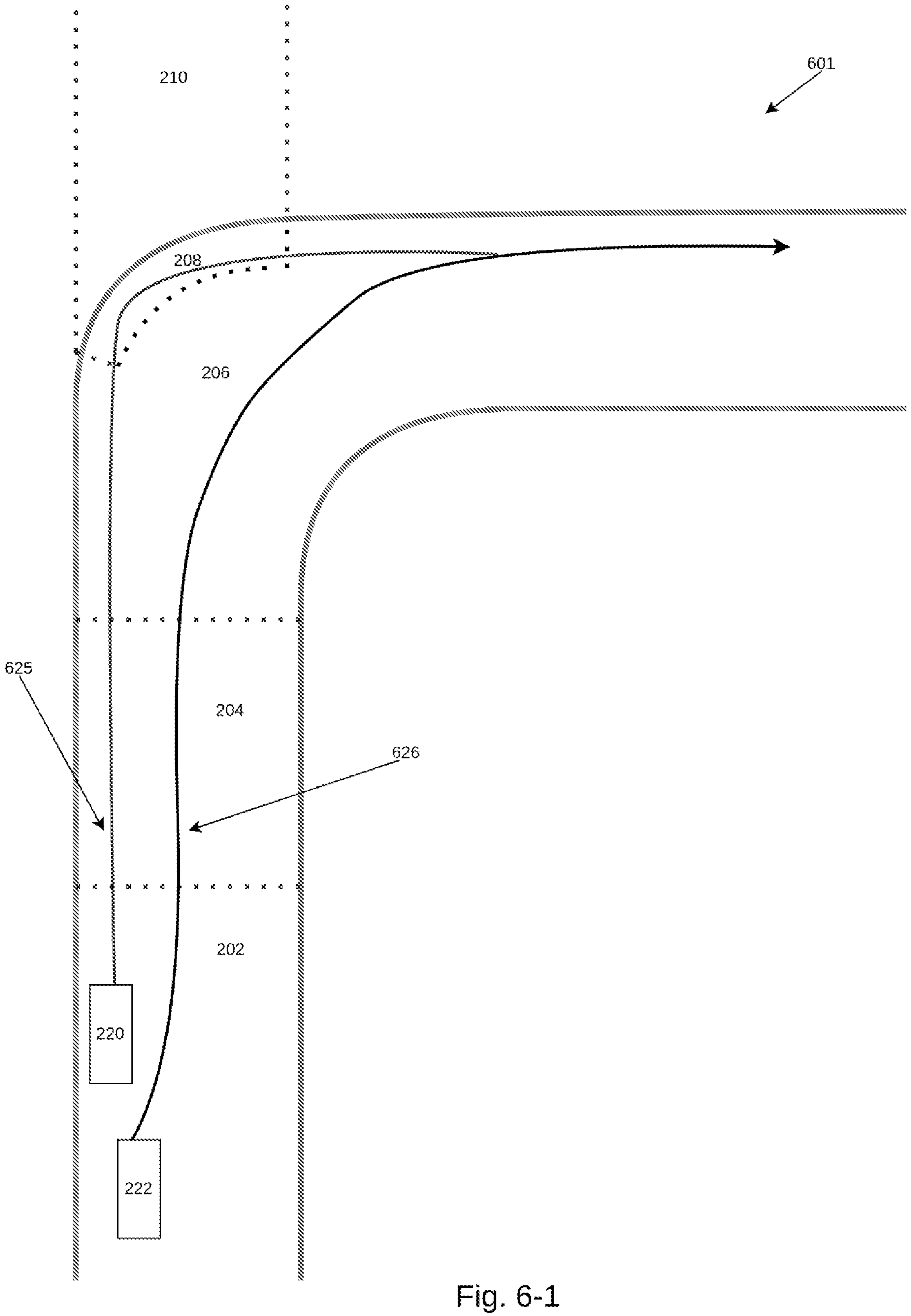

FIG. 6 shows an alternative scenario 600 where car 222 has proposed an overtaking trajectory 621 and car 220 has proposed defense trajectory 623. After receiving a request for a response trajectory in decision-making zone 202, car 222 is unable to calculate a responsive trajectory in time and proposes a safe trajectory 624 that avoids a potential collision. In this scenario, car 220 follows its defense trajectory 623 through curve 206 while car 222 executes trajectory 624 through safety zone 208. Even though car 222 failed to generate a proper line for wheel-to-wheel racing, a collision is avoided and the race continues. In an embodiment, car 222 also receives an instruction from the orchestration platform to observe a power reduction until car 222 has a safety gap of at least y meters. In another embodiment, car 222 maintains a safe distance from car 220 by passing through safety zone 208. In another embodiment, car 222 also receives an instruction from the orchestration platform to observe a speed limit until car 220 has a safety gap of at least y meters. In an embodiment, the value of y is a predetermined number of meters, such as 3 meters. Other units or values for the safety gap may be used in alternative embodiments.

The chronology of the two trajectories 621, 623 is shown by the relative positions of cars 220, 222 at three different times: t1, t2, and t3. Both cars 220 and 222 are in decision-making zone 202 at time t1. At time t2, car 220 has taken an inside line just before entering corner 206 while car 222 executes a trajectory 621 that does not challenge car 220 while in corner 206. At time t3, car 222 has entered safety zone 208 while car 220 has successfully navigated corner 206 and remains ahead of car 222.

FIG. 6-1 shows a variation 601 of the scenario shown in FIG. 6. In this scenario, car 222 follows inside trajectory 626 with respect to car 220. Car 220 follows trajectory 625, taking an outside trajectory with respect to car 220. In this scenario, car 222 successfully overtakes car 220 by following inside trajectory 626. Car 220's trajectory is more responsible for avoiding collision because car 220, taking an outside line, can move further outside to create space for car 222.

Figure 7:
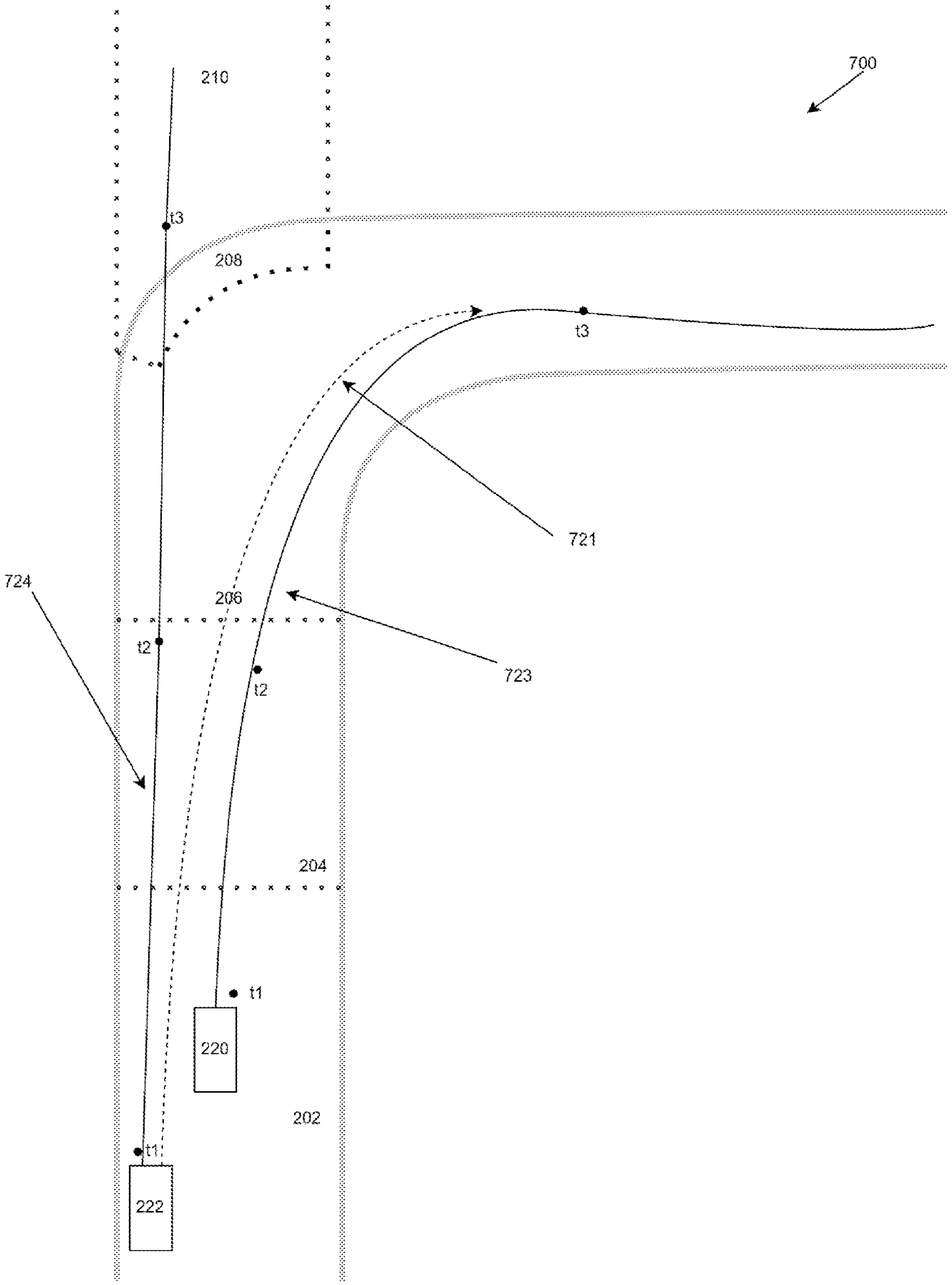
FIG. 7 is a diagram of an alternative overtaking scenario under orchestration platform control, according to an embodiment.
Figures 1, 7:
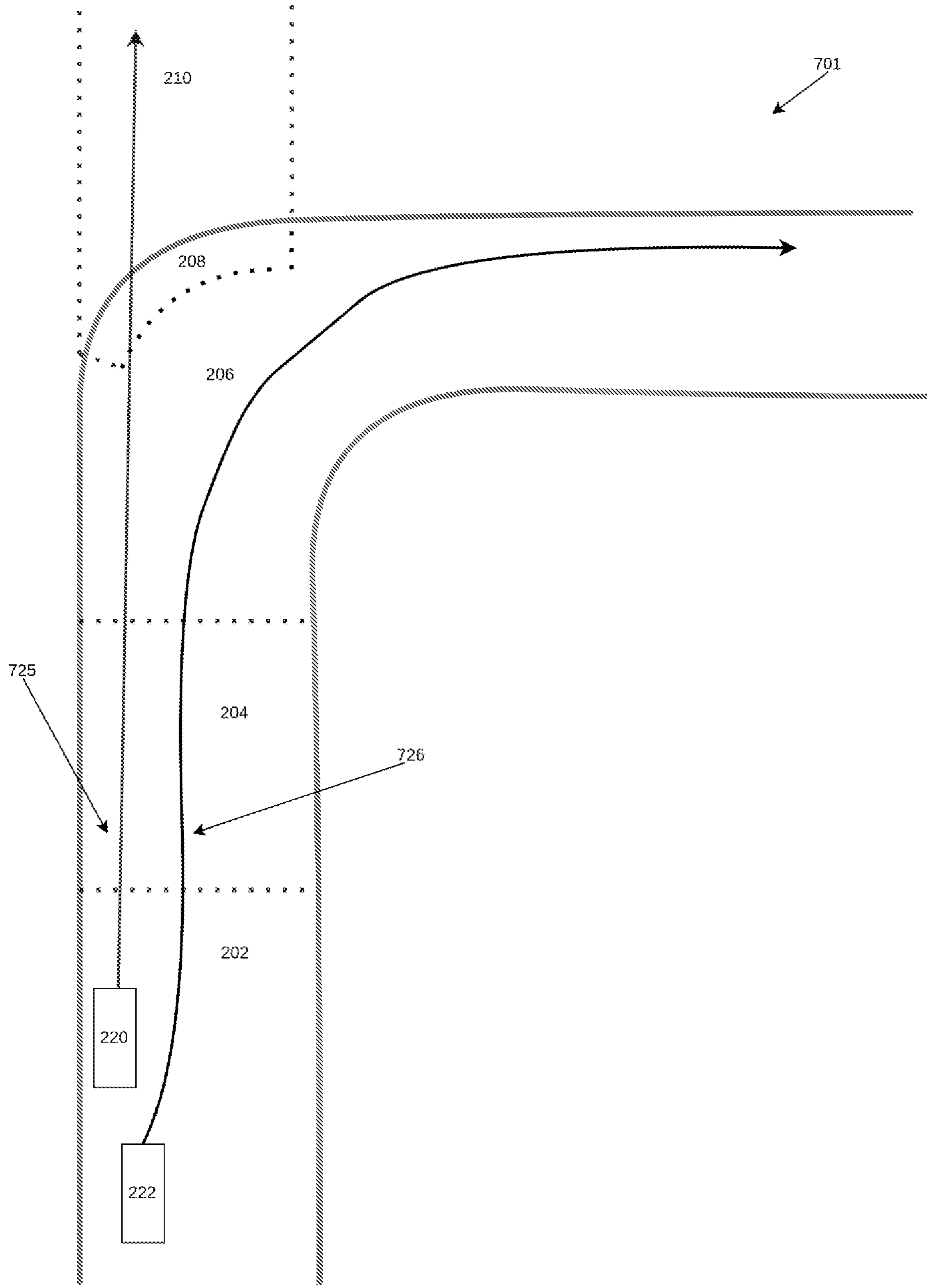

FIG. 7 shows another alternative scenario 700 where car 222 generates an attacking trajectory 721 and car 220 generates defense trajectory 723. Car 222 is unable to generate a response to the defense trajectory 723 of car 220. In the scenario of FIG. 7, car 222 is unable to generate a trajectory through safety emergency zone 208. Car 222 decides to generate a trajectory through zone 210. Car 222 then leaves the track by way of runoff zone 210. The failure to calculate a trajectory may occur because the autonomous vehicles are in decision-making zones only for a limited time. As shown in FIG. 7, an emergency trajectory 721 for a curve may take car 222 off the course. In such scenarios, the race will typically be over for car 222.

In alternative scenario 701 shown in FIG. 7-1, car 222 takes inside trajectory 726 while car 220 takes outside trajectory 725. In this scenario, overtaking is successful by car 222. Car 220 avoids collision by taking trajectory 725. Car 220 was unable to calculate a defensive trajectory that would avoid overtaking by car 222. In scenario 701, car 220 is also unable to generate a defensive trajectory that allows car 220 to navigate the turn. Car 220 therefore uses runoff zone 210 to leave the course safely.

Figure 8:
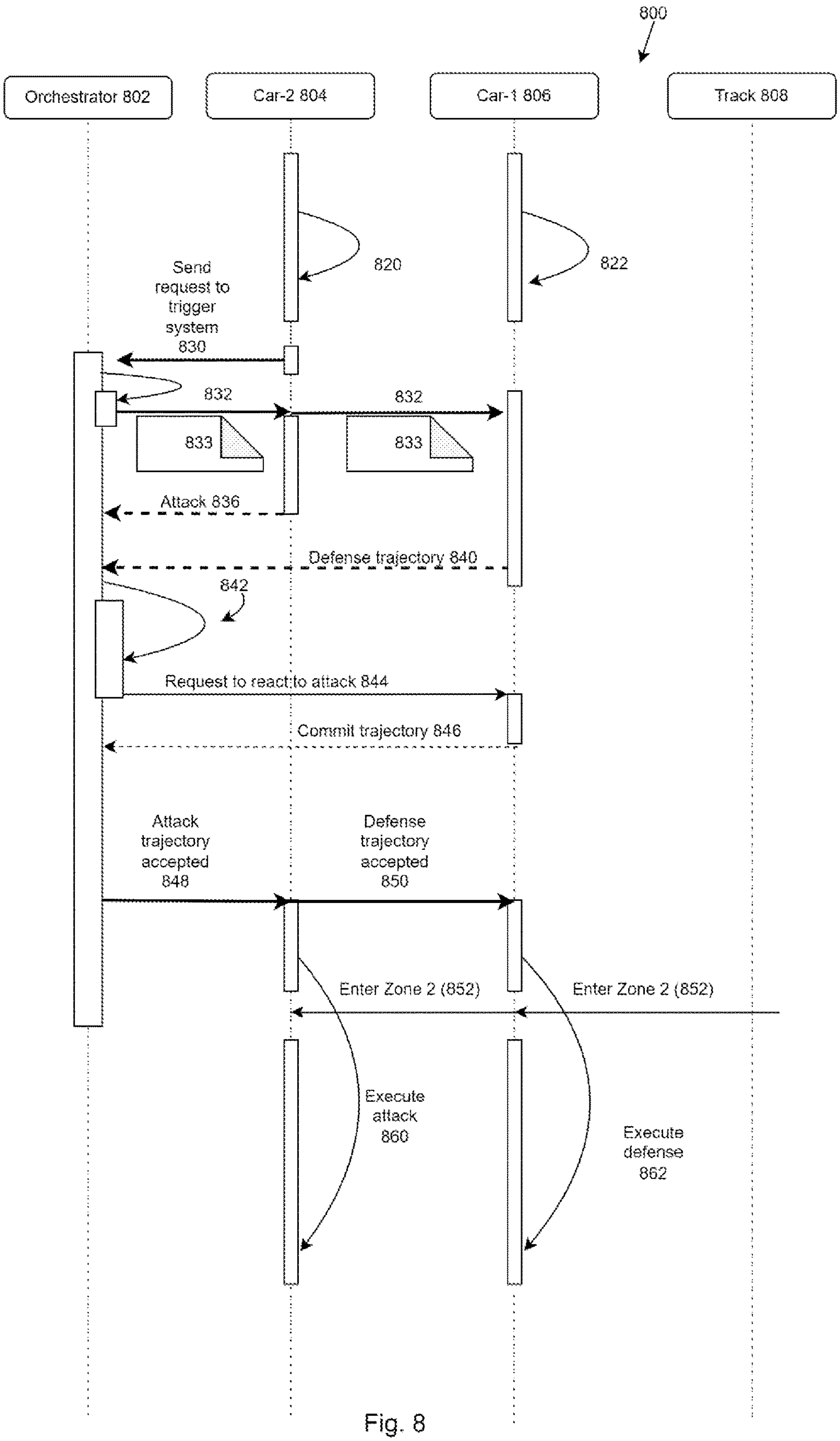
FIG. 8 is a timing diagram of an alternative overtaking scenario under orchestration platform control, according to an embodiment.

FIG. 8 is a timing diagram of an alternative embodiment of an exemplary sequence of events in system 800 comprising orchestrator 802, trailing car-2 804, leading car-1 806, and track 808. In this example, the orchestration platform controls a two-car overtaking scenario.

At the outset of this example, Car-2 804 executes racing line 820 while car-1 806 executes racing line 822. In an embodiment, trailing car-2 104 perceives an opportunity for overtaking car-1 106 and sends a request 830 to trigger orchestration platform overtaking control. In response, orchestrator 802 defines a decision making zone 1 and an execution zone 2 and sends a trigger 832 to both cars. Trigger 832 comprises a zones-definition message 833 with details of the decision-making zone 1 and execution-zone 2. The zones-definition message 833 identifies portions of track 808 for decision making and executing maneuvers. In FIG. 8, zones 1 and 2 have not been predefined but are generated in response to request 830 to trigger orchestration platform overtaking control.

In response to trigger 832 and message 833, car-2 804 proposes attack trajectory 836 and car-1 806 proposes defense trajectory 840. Orchestrator 802 analyzes the proposed attack and defense trajectories. If the proposed attack trajectory meets predetermined parameters, orchestrator 802 accepts the attack trajectory with decision acceptance 842. Orchestrator 802 then sends request 844 to car-1 806 to commit to a safe response to the attack. In response, car-1 806 sends commit trajectory 846.

In this example, orchestrator 802 sends an attack trajectory acceptance 848 to car-2 804 and defense trajectory acceptance 850 to car-1 806. Car-2 804 and car-1 806 then enter zone 2 852, which is an execution zone. When the autonomous vehicles enter zone 2 852, no further trajectory changes are permitted. Once in the execution zone 852, the autonomous vehicles execute the trajectories approved by orchestrator 802. The attack trajectory 860 is executed by car-2 804 and defense trajectory 804 is executed by car-1 806. If the autonomous vehicles execute attack and defense trajectories in accordance with orchestrator 802 instructions, trailing car-2 804 will be able to safely overtake leading car-1 806.

Figure 9:
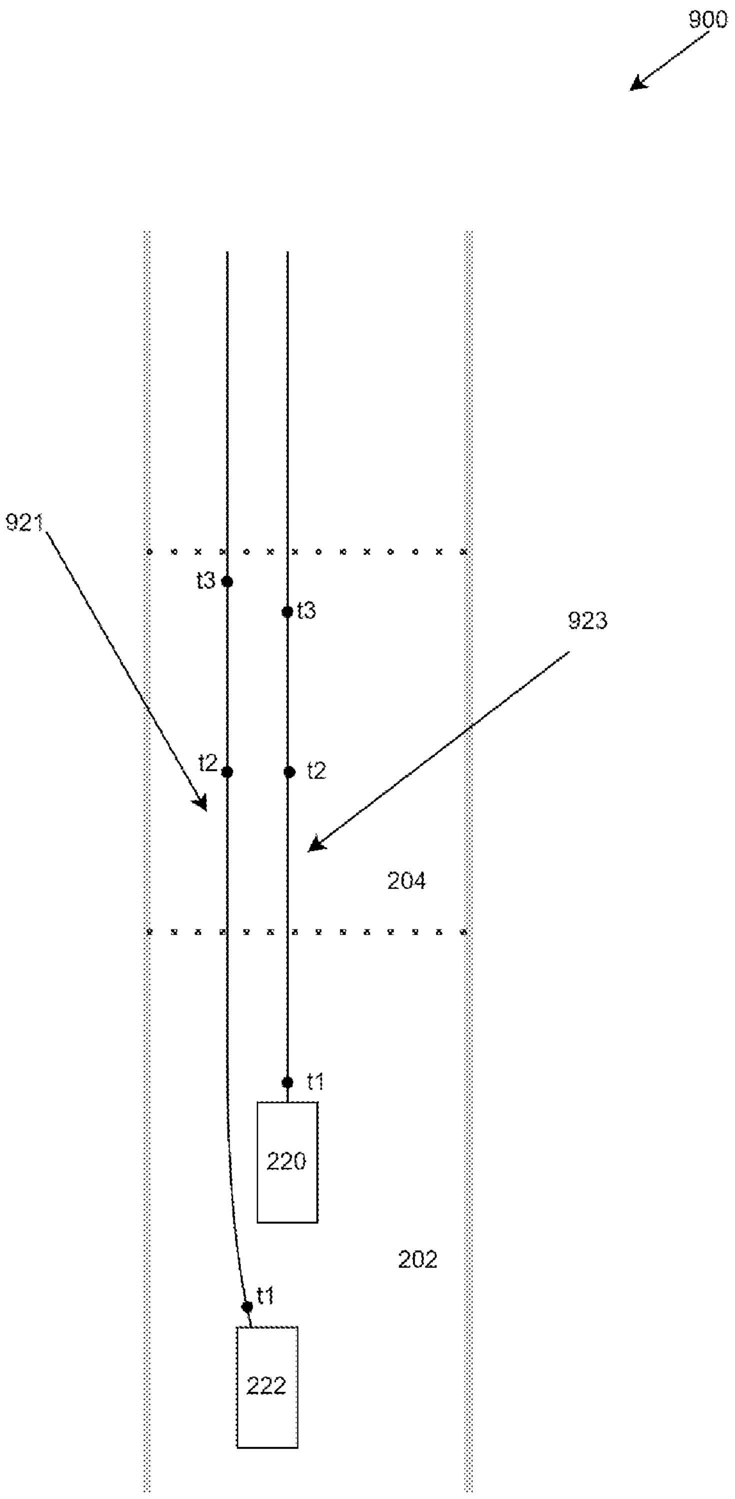
FIG. 9 is a diagram of an alternative overtaking scenario under orchestration platform control, according to an embodiment.

FIG. 9 shows further details of the embodiment of FIG. 8. At time t1, both car 22 and car 220 are in defined decision-making zone 202. Car 222 generated normal line 921 in response to the definition of zone 1 202 and zone 2 204. Car 220 generated defensive line 923 in response to car 2 222. In this embodiment, car 222 approaches car 220 at time t2 and safely overtakes car 220 by time t3.

Figure 10:
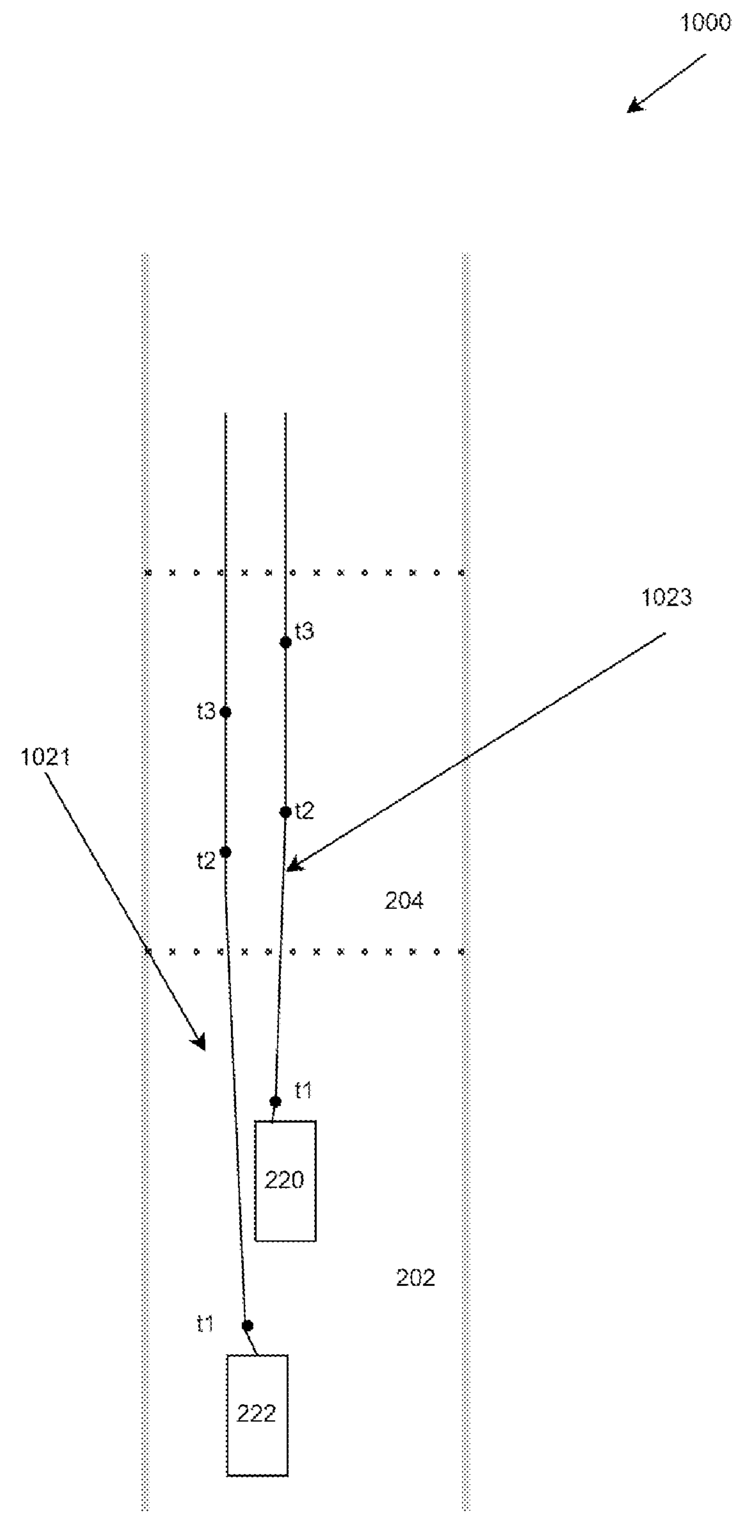
FIG. 10 is a diagram of an alternative overtaking scenario under orchestration platform control, according to an embodiment.

FIG. 10 shows an alternative embodiment in a scenario similar to FIG. 9. Zones 1 and 2 have been defined as decision-making zone 202 and execution zone 204. In FIG. 10, car 222 proposed overtaking trajectory 1021 and car 220 proposed defensive trajectory 1023. In this embodiment, car 222 was not able to execute proposed overtaking trajectory 1021 effectively enough to overtake car 220 at times t2 and t3. Even though trajectory 1021 would not have resulted in overtaking under usual conditions, the platform accepts trajectory 1021 as valid. Car 220 remains in the lead at time t3 and although car 222 did not execute trajectory 1021 as proposed, trajectories 1021 and 1023 were valid trajectories and cars 222 and 220 maintain safe parameters and avoid collision.

Figure 11:
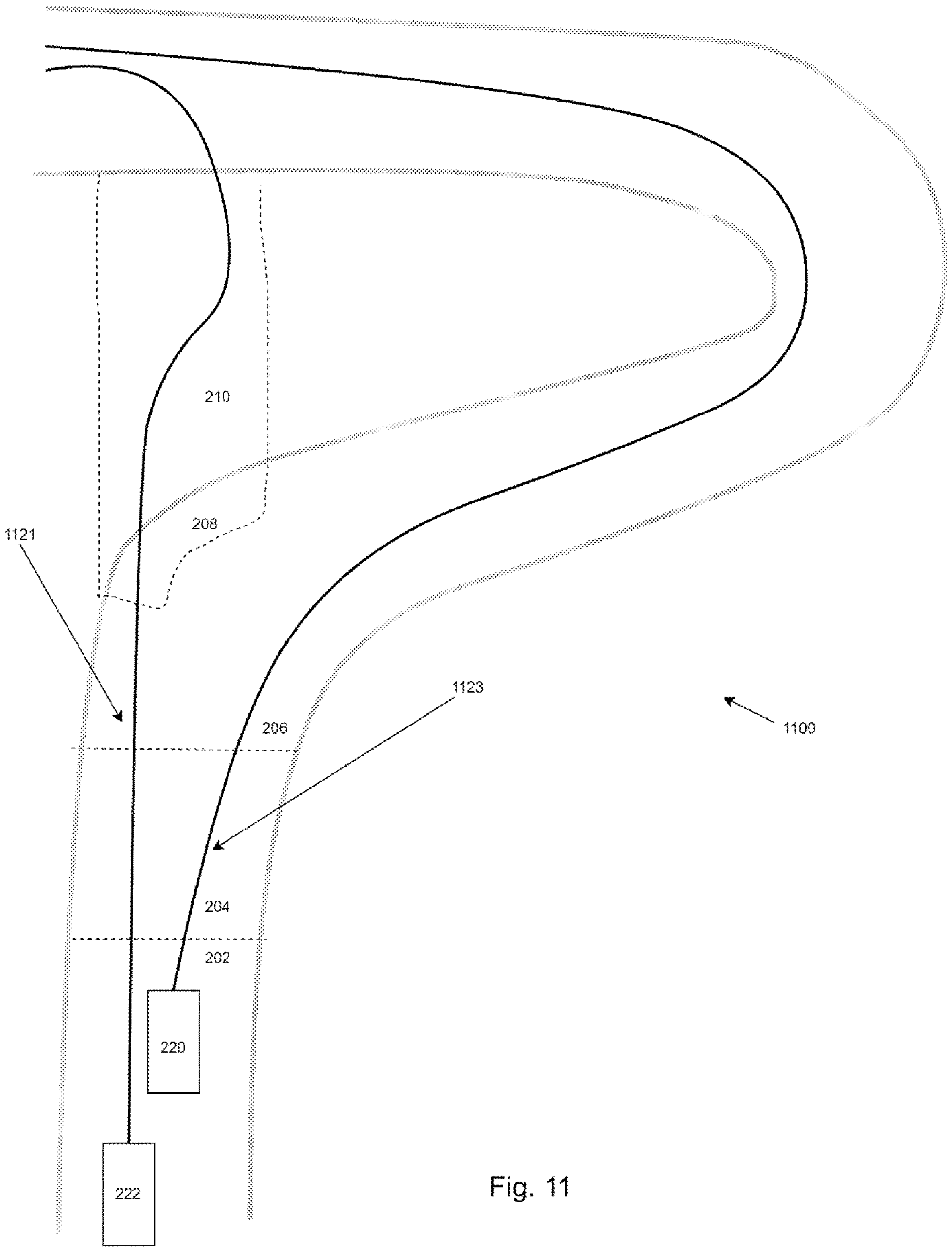
FIG. 11 is a diagram of an overtaking scenario where the following autonomous vehicle leaves the course, according to an embodiment.
Figure 12:
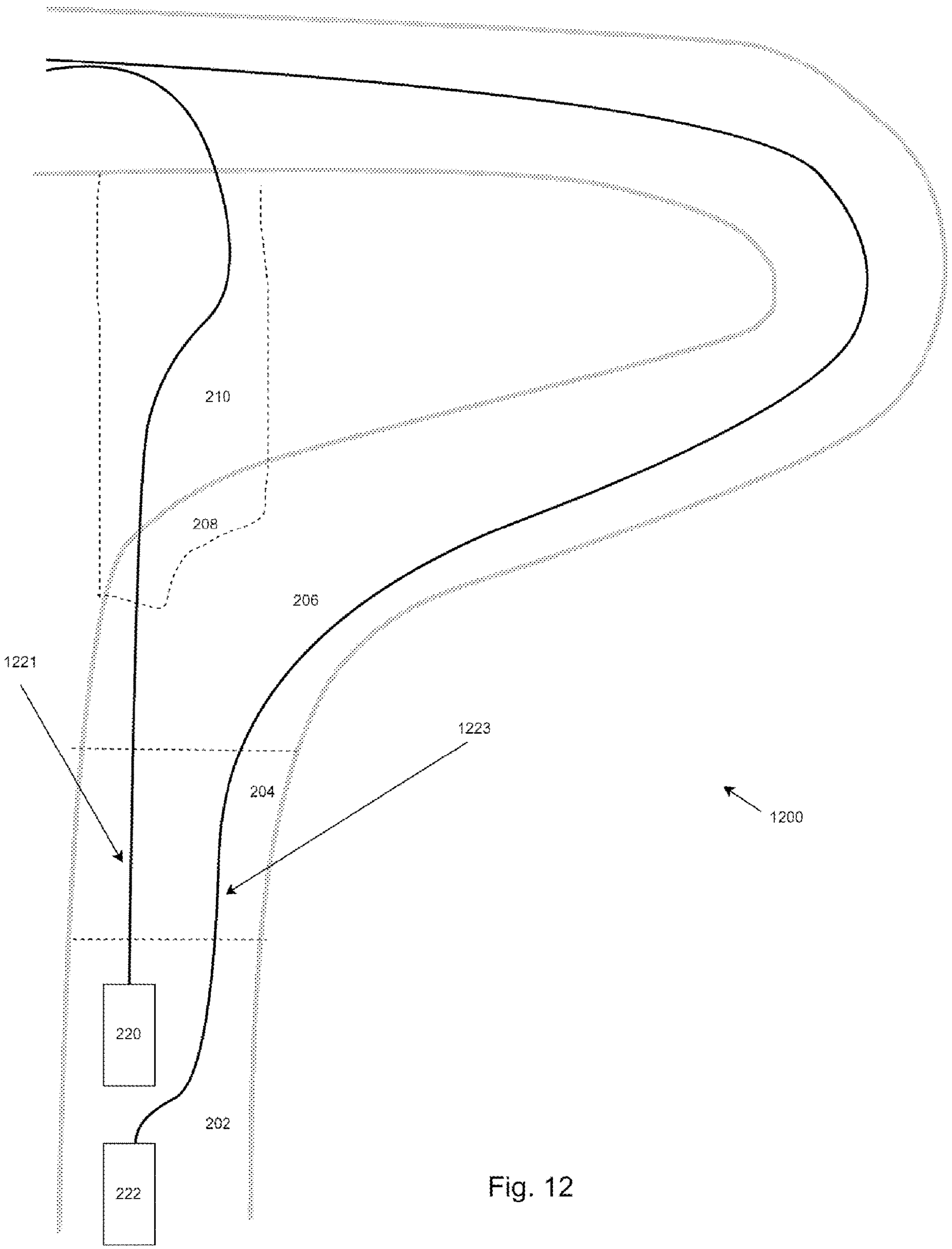
FIG. 12 is a diagram of an overtaking scenario where the leading autonomous vehicle leaves the course, according to an embodiment.

FIGS. 11 and 12 show alternative embodiments 1100 and 1200 where one of the autonomous vehicles executes a trajectory through safety zone 208 and run-off area 210. In FIG. 11, car 222 is trailing and executes trajectory 1121 through safety zone 208 and run-off area 210 before continuing the race. Car 220 maintains trajectory 1123 through curve 206. In FIG. 12, car 220 is leading and executes trajectory 1221 through safety zone 208 and run-off area 210 before continuing the race. In FIGS. 11 and 12, trajectories 1121 or 1221 could also end in run-off area 210. In some embodiments, car 222 proposed a valid overtaking trajectory in FIG. 11 but executed trajectory 1121 instead. In alternative embodiments, car 222 proposed valid overtaking trajectory 1223 in FIG. 12 and car 220 proposed a valid defensive trajectory, but actually executed trajectory 1221.

Figure 13:
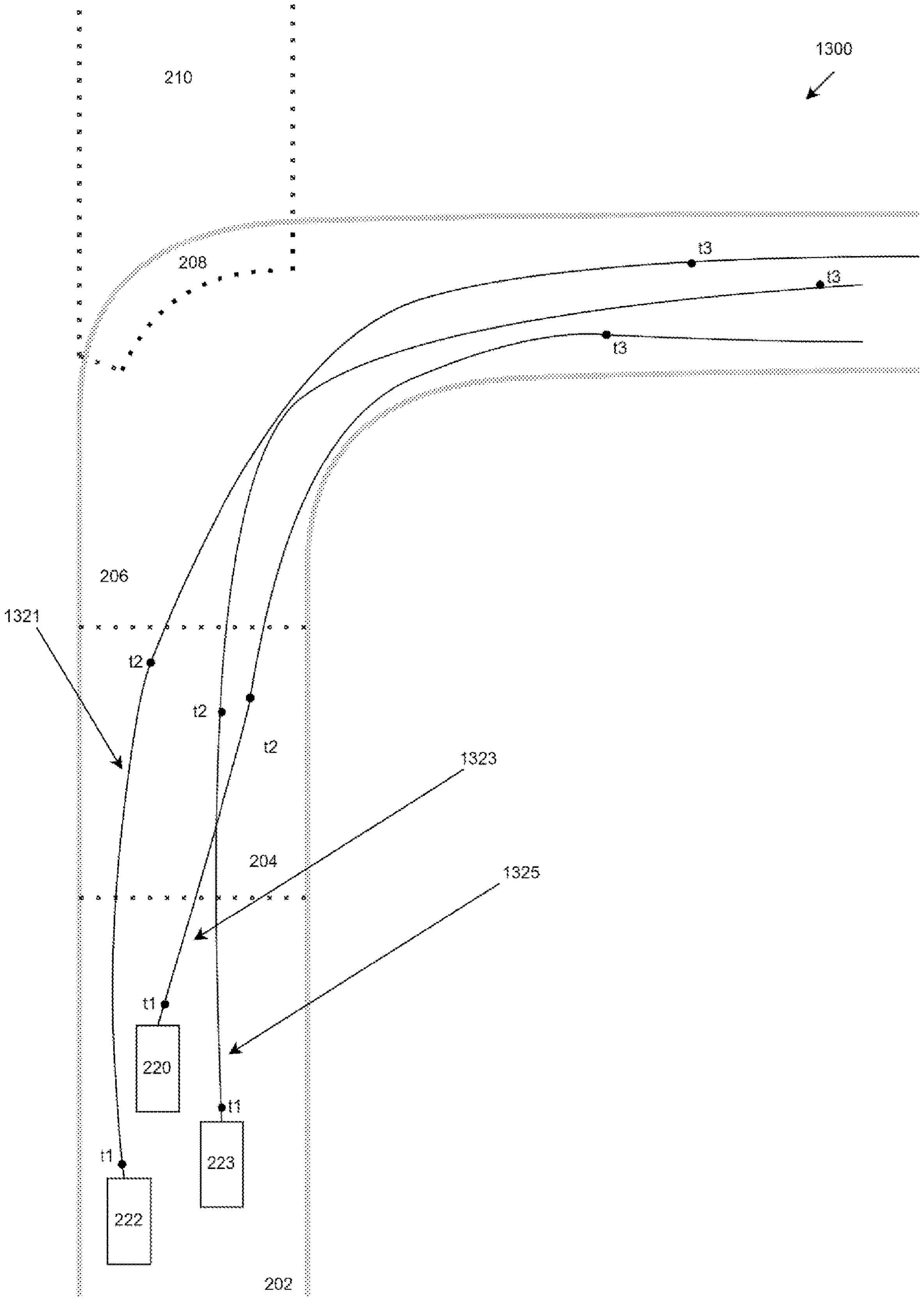
FIG. 13 is a diagram of an alternative overtaking scenario involving more than two autonomous vehicles, according to an embodiment.

FIG. 13 shows an alternative embodiment 1300 with more than 2 autonomous vehicles. In this embodiment, 3 cars 222, 220, and 223 fight for the lead through corner 206. Car 220 leads, car 223 is in second position, and car 222 is in third position. Car 223 has an advantage over car 220. Car 222 also has an advantage over car 220. At time t1 while the three cars are in zone 202, the orchestration platform has triggered the system. For purposes of overtaking, the platform treats the cars as pairs. The orchestration platform is triggered when two cars enter zone 202 or alternatively, when one car enters zone 202. As in embodiments with two autonomous vehicles, the platform validates trajectories that meet racing parameters and safety conditions.

Car 223 proposes trajectory 1325 through zones 204 and 206. Car 220 proposes trajectory 1323 and car 222 proposes trajectory 1321. Car 222's trajectory is an overtaking trajectory with respect to car 220 and an overtaking trajectory with respect to car 223. Car 220's trajectory is a defensive trajectory with respect to cars 222 and 223. Car 223's trajectory is an overtaking trajectory with respect to car 220 and a defensive trajectory with respect to car 222. These proposed trajectories are sent to the platform at time t1 while all three cars are in decision-making zone 202. The orchestration platform selects valid trajectories for each case of attack and defense and communicates the results to cars 220, 222, and 223. The cars then execute the validated trajectories. In the embodiment of FIG. 13, car 223's trajectory 1325 was executed so that car 223 achieved overtaking of car 220 by time t3. Car 222's trajectory 1321 resulted in a leading position at time t2 and second position at time t3. Car 220's trajectory 1323 resulted in second position at time t2 and third position at time t3.

In alternative embodiments, the number of autonomous vehicles may be represented as some number n. In these embodiments, cars are treated as pairs for purposes of overtaking. Thus, if n=4 cars enter a decision-making zone, each car may propose an overtaking or defending trajectory with respect to each of the other 3 cars. The orchestration platform will resolve each two-way battle between cars and validate safe trajectories according to racing and safety parameters.

In some embodiments of the orchestration platform, decision-making zones are predetermined based on specific course geometry. In one example, a decision-making zone for a particular track is established 200 m before a curve. The optimal area where overtaking can take place safely is factored into setting off decision-making zones on a course. For example, in some parts of the track the roadway may be too narrow or the optimal line difficult to calculate within tolerances.

In some embodiments, the orchestration platform's approval of proposed trajectories is linked to the designation of decision-making zones and execution zones on the track. For example, attacking trajectories are more likely to be approved at points where the track is wider. Acceptance of attacking trajectories is based in part on predetermined vehicle-spacing parameters. Where the overtaking car has a high speed differential, spacing is less likely to result in rejection of a proposed attack trajectory. But when the speed differential is close to the lower limit, more space will be required to maintain safe distances and thus fewer parts of the track will allow for generous approval of attack trajectories.

Once chosen by the orchestration platform, decision-making zones are identified for all racing agents in advance of the race. Racing agents are also instructed to compute attacking trajectories only in the decision-making zones. For example, over a five km track, there are a number of turns and before each turn, a decision-making zone will be identified. The predetermination of decision-making zones imposes time-constraints on racing agents. The predetermined decision making zones also allow for calculation of trajectories or approximation of trajectories before the race because all racing agents know where the decision-making and execution zones start. In autonomous racing, all racing agents typically use the same or similar hardware and software. In many embodiments, racing agents can also make pre-race calculations based on expected trajectories of the other racing agents.

In some embodiments, orchestration-platform control will not allow a trailing autonomous vehicle to execute a proposed attack trajectory. For example, the leading car may propose a defense trajectory that comprises an optimal racing line that effectively blocks the attacking car. The defense trajectory may succeed because the attacking trajectory is suboptimal. Alternatively, the defense trajectory may succeed because the attacking trajectory has insufficient speed differential for the amount of space available for overtaking in a given curve.

In alternative embodiments, the orchestration platform asks the leading car for a defense trajectory more than once while in the decision-making zone. For example, another defense trajectory may be requested if the first defense trajectory does not comply with safety requirements. In an embodiment, a second request for a defense trajectory may be requested if no defense trajectory is received within a predetermined time after the first request. The x time unit for the predetermined threshold will depend on the size of the decision-making zone and no further trajectory will be requested after a car leaves a decision-making zone. Second and subsequent requests may also be made of the trailing car if, for example, the first proposed attack trajectory does not meet minimum safety thresholds. The time between requests may also account for the compute required to generate an attack trajectory. For example, if racing agents are unable to respond to requests for attack and defense trajectories in less than a predetermined time, the timing of follow-up requests will not be shorter than the time needed to calculate an attack or defense trajectory.

In some embodiments, racing agents that provide trajectories resulting in collision will receive penalties. The penalties may be issued by the orchestration platform directly or after review by race officials. Penalties may take the form of time penalties, such as 5 seconds, 10 seconds, or drive-through (typically having to leave the track and drive through the pit lane at the reduced pit-lane speed before rejoining the track). A more severe penalty, such as a stop-go penalty (typically having to leave the track and make a pit stop without servicing the car) may also be imposed. The orchestration platform approves proposed attack and defense trajectories on the assumption that the proposing racing agents can successfully execute the proposed trajectories. If a racing agent cannot execute a proposed trajectory after approval, a penalty may be assessed to discourage overly optimistic proposals.

The orchestration platform generally assumes that a racing agent's proposed trajectory can be executed. In some embodiments, the orchestration platform has access to autonomous vehicle performance statistics and makes limited threshold determinations about whether a proposed trajectory is possible in view of car performance parameters and track conditions. In ordinary cases, however, the platform will accept proposed trajectories and issue penalties to racing agents that cannot execute their proposals.

Figure 14:
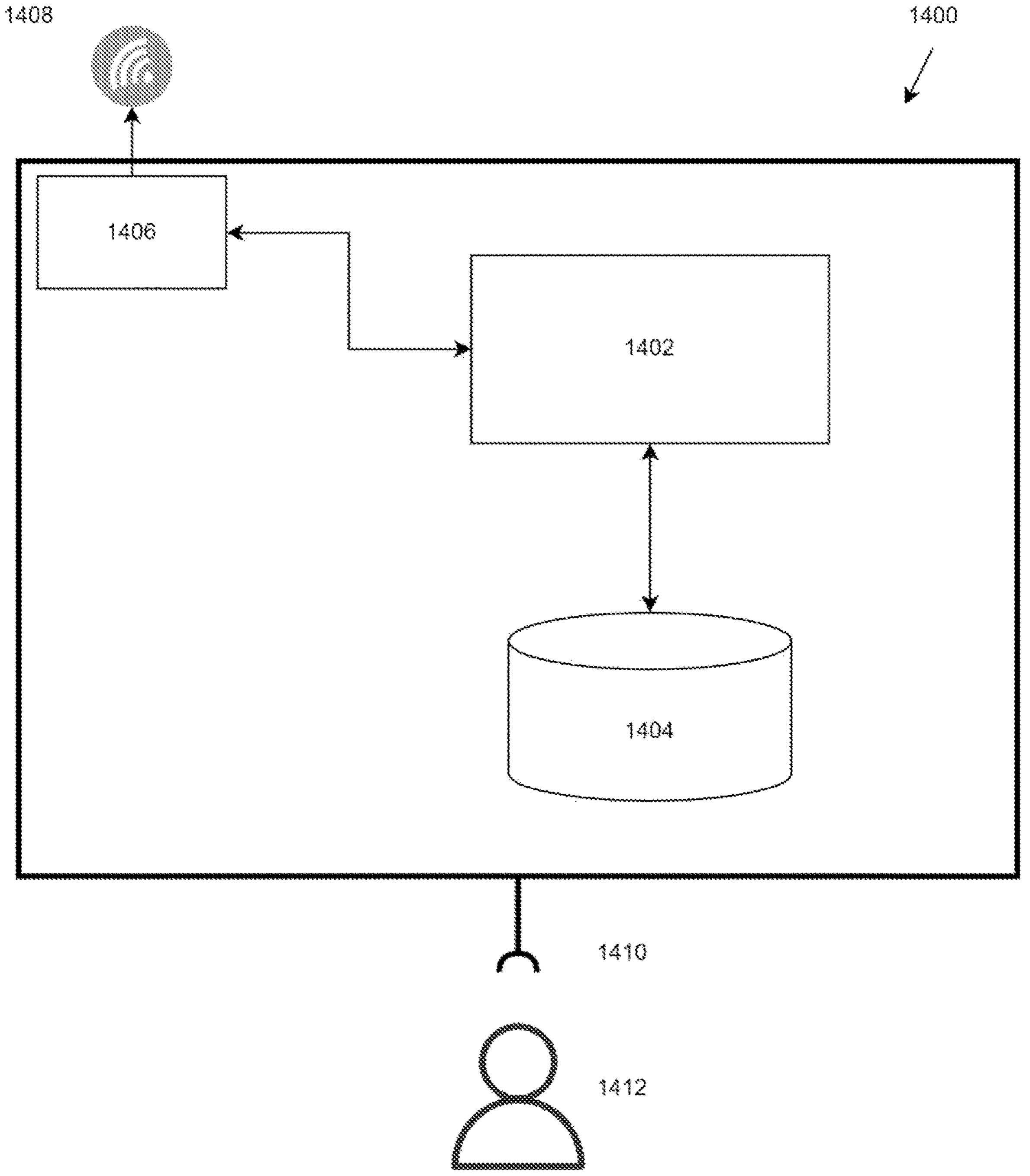
FIG. 14 is a block diagram of a controller, according to an embodiment.

FIG. 14 is a block diagram of an exemplary control unit 1400 in accordance with an embodiment. Processor 1402 is coupled with storage 1404 and transmitter/receiver 1406. Control unit 1400 communicates by way of wireless signal 1408 with autonomous vehicles under platform control. Control unit 1400 is accessed by user interface 1410 by user 1412. In some embodiments, an access-control system restricts users to a limited number of authorized racing officials and technical-support personnel. Control unit 1400 in some embodiments is positioned at a location remote from the autonomous vehicles under platform control. In other embodiments, control unit 1400 can be onboard one or more autonomous vehicles. A system with both remote and onboard control units can also be implemented.

The orchestration platform can be implemented at the track level through the use of stationary hardware installed locally. Alternatively, the orchestration platform can be implemented as a cloud-based system or by the autonomous vehicles themselves. In a car-based system, the orchestration platform operates as a message protocol exchange where each car supports the protocol. In these embodiments, race-control elements, including hardware and software configured for message exchange are associated with each car or with each racing agent. Protocol algorithms of negotiation may be employed that ensure secure exchanges by using encrypted trajectories. In certain embodiments, an exchange of cryptographic keys between the cars is used. For example, proposed trajectories are exchanged in encrypted form by two racing agents while in decision-making zones. Encryption keys are used to decrypt the proposed trajectories and each racing team processes the attack and defense trajectories using the same algorithm. Proposed trajectories are permitted or denied after each racing team independently applies the same orchestration-platform algorithm. When agreed upon attack and defense trajectories are confirmed, the racing teams execute these trajectories in the execution zone. When the racing teams are unable to confirm an attack and defense trajectory, each car will maintain its current trajectory and optionally propose an emergency trajectory to avoid collision.

The hardware for implementing the orchestration platform includes vehicle-to vehicle-communications equipment. In an embodiment, Vehicle-to-Anything (V2X) infrastructure may be used to send information and requests to racing agents. In one embodiment, computing devices with processors and memory may be installed on the autonomous vehicles, on the track, or on both. The autonomous vehicles and track can be equipped with sensors to track relative positions, geolocation, and racing parameters such as velocity, acceleration, and vehicle performance. Racing agents may maintain control of the autonomous vehicles remotely and perform calculations on-vehicle or remotely, or in combination.

In alternative embodiments, the autonomous racing cars themselves calculate their paths under an orchestration protocol in connection with predetermined track zones. In some of these embodiments, calculations are performed at the car level by onboard control-unit hardware and software. In an embodiment, control unit hardware and software are modular and isolated from other car hardware or software. Alternatively, some or all of the control unit hardware may be virtualized by, for example, running as a guest in a container using computing resources of the host autonomous car. In an embodiment, the car-level control units are secured so that racing agents may not tamper with control-unit hardware or software. For example, a self-contained control unit can be installed on each car under orchestration platform control. The onboard control units can be configured with their own wireless receivers and transmitters. In an embodiment, each autonomous vehicle or racing agent communicates directly with the onboard control unit and the onboard control unit communicates with the onboard control units associated with other autonomous vehicles. Thus, vehicle-to-vehicle communication can take place by way of onboard control units only. Alternatively, the autonomous vehicles or racing agents can use their own wireless communication devices to communicate with other autonomous vehicles or racing agents. Communications received can be passed to the onboard control unit for analysis and response. In some embodiments, the vehicles send each other only encrypted messages and data. The onboard control units then use public key cryptography or other encryption tools to decrypt the messages and data. In an embodiment, only the onboard control units can decrypt and understand the proposed trajectories received from other autonomous vehicles or racing agents. The autonomous cars and racing agents learn only the control unit's decisions and are unable to tamper with the inputs the onboard control units receive.

In other embodiments, the orchestration platform acts as a master path coordinator for the autonomous vehicles and no control units are installed at the vehicle level. In these embodiments, all calculations are performed by the platform at a location apart from the autonomous vehicles and the racing agents. Alternatively, control-unit functionality can be distributed. For example, processing of trajectories can be performed at a central location apart from the autonomous vehicles while detecting entry into a decision-making zone or evaluation of successful performance of a proposed trajectory is performed by an onboard control unit.

Reviewing control units can also be employed to validate decisions made by onboard control units, track-based control units, or remote control units. For example, a racing agent may dispute a determination made by a control unit during a race because of a hardware malfunction, software error, or communication error. In such cases, appeal can be made to one or more reviewing control units applying the same algorithms and predetermined parameters in effect during the race.

The invention claimed is:

1. A system for managing overtaking by autonomous vehicles, the system comprising:

a control unit comprising a computing device with a processor, the control unit further comprising a wireless transmitter and receiver;

a course with defined zones along a path, the zones comprising:

an execution zone on the path, and a decision zone proximate to and before the execution zone on the path, the decision zone comprising a continuous zone on the path defined by a decision zone boundary;

a number n of autonomous vehicles, wherein the decision zone and the execution zone are selected by the control unit to be the same for all n autonomous vehicles;

wherein, when in the same decision zone within the decision zone boundary, each of the n autonomous vehicles is a first autonomous vehicle with respect to each following vehicle and a second autonomous vehicle with respect to each leading vehicle;

wherein the wireless transmitter and receiver are configured for communication with the first and second autonomous vehicles;

wherein the computing device is configured for comparing proposed overtaking trajectories and counter-trajectories received from the first and second autonomous vehicles;

wherein the control unit is configured to receive a proposed overtaking trajectory from the second autonomous vehicle when the first autonomous vehicle is ahead of the second autonomous vehicle on the path and the second autonomous vehicle enters the decision zone;

wherein when the control unit is configured to receive a proposed overtaking trajectory from the second autonomous vehicle, the control unit is configured to request a proposed counter-trajectory from the first autonomous vehicle;

wherein the requested proposed counter-trajectory comprises an alternative trajectory through the execution zone by the first autonomous vehicle that accounts for the proposed overtaking trajectory by the second autonomous vehicle;

wherein the computing device is configured to compare the proposed overtaking trajectory with the proposed counter-trajectory; and wherein the control unit is configured to send a rejection of the proposed overtaking trajectory to the second autonomous vehicle and further send an instruction to the first autonomous vehicle to proceed with the proposed counter-trajectory and execute the proposed counter-trajectory by the first autonomous vehicle if the proposed counter-trajectory allows the first autonomous vehicle to remain ahead of the second autonomous vehicle in the execution zone;

wherein the control unit is configured to send an approval of the proposed overtaking trajectory to the second autonomous vehicle to execute the proposed overtaking trajectory by the second autonomous vehicle and further send an instruction to the first autonomous vehicle to maintain its current trajectory and allow the second autonomous vehicle to pass if the counter-trajectory does not allow the first autonomous vehicle to remain ahead of the second autonomous vehicle in the execution zone.

2. The system of claim 1, wherein the control unit is located proximate the course and separate from the first autonomous vehicle and the second autonomous vehicle.

3. The system of claim 1, wherein the control unit is distributed between the first autonomous vehicle and the second autonomous vehicle.

4. The system of claim 1, wherein the number of n autonomous vehicles is 3 or more.

5. The system of claim 1, wherein the decision zone is identified for the n autonomous vehicles after the n autonomous vehicles enter the decision zone.

6. The system of claim 1, wherein the defined zones are predefined and shared with the n autonomous vehicles before the n autonomous vehicles enter the decision zone.

7. A method for controlling overtaking by a leading first autonomous vehicle and trailing second autonomous vehicles on a course comprising a curve using a control unit including a processor, a nonvolatile storage medium, and a wireless transmitter and receiver for communication with the first and second autonomous vehicles, the method comprising:

identifying for the first and second autonomous vehicles a predetermined execution zone and a predetermined decision zone on the course located before the curve, the decision zone being located proximate and before the execution zone, the decision zone comprising a continuous zone on the course defined by a decision zone boundary, and the curve being located proximate and after the execution zone, and wherein the decision zone and the execution zone are selected by the control unit to be the same for all autonomous vehicles on the course;

detecting, with a first sensor, the entry of the first and second autonomous vehicles in the decision zone within the decision zone boundary;

sending, by the wireless transmitter, a request for a proposed overtaking trajectory to the second autonomous vehicle;

sending, by the wireless transmitter, a request for a proposed defensive trajectory to the first autonomous vehicle;

receiving, by the wireless receiver, a proposed overtaking trajectory from the second autonomous vehicle;

receiving, by the wireless receiver, a proposed defensive trajectory from the first autonomous vehicle;

comparing, by the control unit, the proposed overtaking trajectory with predetermined minimum requirements for the autonomous vehicles during an overtaking;

sending, by the wireless transmitter, an approval of the proposed overtaking trajectory to the second autonomous vehicle if the predetermined minimum requirements are satisfied;

comparing, by the control unit, the proposed defensive trajectory with predetermined minimum requirements;

sending, by the wireless transmitter, an approval of the proposed defensive trajectory to the first autonomous vehicle if the predetermined minimum requirements are satisfied including if the proposed defensive trajectory does not allow the first autonomous vehicle to remain ahead of the second autonomous vehicle in the execution zone;

sending, by the wireless transmitter, a rejection of the proposed defensive trajectory if the proposed defensive trajectory does not meet predetermined minimum requirements, including sending an instruction to the first autonomous vehicle to maintain its current trajectory and allow the second autonomous vehicle to pass if the proposed defensive trajectory does not allow the first autonomous vehicle to remain ahead of the second autonomous vehicle in the execution zone;

sending, by the wireless transmitter, a confirmation of accepted trajectories to the first and second autonomous vehicles; and executing, by the first and second autonomous vehicles, respective accepted trajectories.

8. The method of claim 7, wherein the predetermined requirements for overtaking include a minimum velocity advantage or a space advantage for the second autonomous vehicle with respect to the first autonomous vehicle, wherein the space advantage comprises relative position and on-track position of the first and second autonomous vehicles.

9. The method of claim 7, wherein the predetermined requirements for overtaking include a minimum safe distance between the first and second autonomous vehicles.

10. The method of claim 7, wherein if a proposed defensive trajectory is not received at the control unit from the first autonomous vehicle, a second request for a proposed defensive trajectory is sent to the first autonomous vehicle while the first autonomous vehicle remains in the decision zone.

11. The method of claim 7, further comprising:

requesting, by the wireless transmitter, an alternative safety trajectory from the first autonomous vehicle after the first autonomous vehicle enters the decision zone;

receiving, by the wireless receiver, the requested alternative safety trajectory from the first autonomous vehicle; and sending, by the wireless transmitter, a confirmation of the alternative safety trajectory to the first autonomous vehicle.

12. The method of claim 11, further comprising:

detecting, by a second sensor, the actual path of the first autonomous vehicle and comparing the actual path with the proposed defensive trajectory.

13. The method of claim 12, further comprising:

storing, at the control unit, a record of variance between the proposed defensive trajectory and the actual path of the first autonomous vehicle.

14. A method for controlling overtaking by first and second autonomous vehicles on a course, the first and second autonomous vehicles having a control unit including a processor, a nonvolatile storage medium, and a wireless transmitter and receiver for communications between the control units of the first and second autonomous vehicles, the method comprising:

detecting, by the second autonomous vehicle, entry of the second autonomous vehicle into a predetermined decision zone the decision zone comprising a continuous zone on the course defined by a decision zone boundary;

determining, by the second autonomous vehicle, that the second autonomous vehicle is trailing the first autonomous vehicle;

calculating, by the second autonomous vehicle, an overtaking trajectory with respect to the first autonomous vehicle;

sending, by the wireless transmitter of the second autonomous vehicle, a proposed overtaking trajectory to the first autonomous vehicle;

receiving, by the wireless receiver of the second autonomous vehicle, a proposed defensive trajectory from the first autonomous vehicle in response to the proposed overtaking trajectory;

comparing, by the control unit of the second autonomous vehicle, the proposed overtaking trajectory with the proposed defensive trajectory;

deciding, by the control unit of the second autonomous vehicle, whether the overtaking is permitted in accordance with predetermined requirements;

when the overtaking is permitted:

sending, by the wireless transmitter of the second autonomous vehicle, a control unit decision that the overtaking trajectory is permitted including sending an instruction to the first autonomous vehicle to maintain its current trajectory and allow the second autonomous vehicle to pass if the proposed defensive trajectory does not allow the first autonomous vehicle to remain ahead of the second autonomous vehicle in the execution zone, and requesting confirmation of the decision by the first autonomous vehicle, receiving, by the wireless receiver of the second autonomous vehicle, a confirmation from the first autonomous vehicle that the proposed overtaking trajectory is permitted, and executing, by the second autonomous vehicle, the proposed overtaking trajectory, in a predetermined execution zone on the course:

when the overtaking is not permitted, sending an instruction to the first autonomous vehicle to proceed with the proposed defensive trajectory and execute the proposed defensive trajectory by the first autonomous vehicle if the proposed defensive trajectory allows the first autonomous vehicle to remain ahead of the second autonomous vehicle in the execution zone:

wherein the decision zone and the execution zone are selected by the control unit to be the same for all autonomous vehicles on the course.

15. The method of claim 14, wherein a control unit is installed onboard each of the first and second autonomous vehicles.

16. The method of claim 14, wherein the onboard control unit hardware is virtualized.

17. The method of claim 14, wherein the predetermined requirements for overtaking include a minimum velocity advantage or space advantage for the second autonomous vehicle with respect to the first autonomous vehicle, wherein the space advantage comprises relative position and on-track position of the first and second autonomous vehicles.

18. The method of claim 14, wherein the predetermined requirements for overtaking include a minimum safe distance between the first and second autonomous vehicles.

19. The method of claim 14, wherein if a proposed defensive trajectory is not received at the second autonomous vehicle from the first autonomous vehicle, a second request for a proposed defensive trajectory is sent to the first autonomous vehicle while the first autonomous vehicle remains in the decision zone.

20. The method of claim 19, further comprising:

requesting, by the wireless transmitter of the second autonomous vehicle, an alternative safety trajectory from the first autonomous vehicle while the first autonomous vehicle is still in the decision zone.

* * * * *